(12) United States Patent
Mifune et al.

(10) Patent No.: US 7,199,794 B2
(45) Date of Patent: *Apr. 3, 2007

(54) PICTURE PROCESSING DEVICE, PICTURE PROCESSING METHOD, AND GAME DEVICE AND STORAGE MEDIUM USING THE SAME

(75) Inventors: Satoshi Mifune, Tokyo (JP); Masaki Yamashita, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 728 days.

This patent is subject to a terminal disclaimer.

(21) Appl. No.: 10/261,489

(22) Filed: Oct. 2, 2002

(65) Prior Publication Data

US 2003/0032483 A1 Feb. 13, 2003

Related U.S. Application Data

(62) Division of application No. 08/765,328, filed on May 1, 1997, now Pat. No. 6,542,155.

(51) Int. Cl.
*G06T 17/00* (2006.01)

(52) U.S. Cl. .................. 345/428; 345/419; 345/422; 345/581; 463/1; 463/2; 463/3; 463/4; 463/5; 463/6; 463/31; 463/32; 463/33; 463/34

(58) Field of Classification Search ................ 345/428, 345/419, 422, 581; 463/42, 1–6, 31–34
See application file for complete search history.

(56) References Cited

U.S. PATENT DOCUMENTS

| | | | |
|---|---|---|---|
| 4,479,784 A | 10/1984 | Mallinson et al. | |
| 5,242,306 A | 9/1993 | Fisher | |
| 5,566,287 A | 10/1996 | Delpuch | |
| 5,616,031 A | * 4/1997 | Logg | ............................ 434/38 |
| 5,764,232 A | 6/1998 | Oouchi | |

FOREIGN PATENT DOCUMENTS

EP 0 321 291 A2 6/1989

(Continued)

OTHER PUBLICATIONS

Sori Unuma et al., "Modeling of Crowd's Behavior—Interaction Between a Crowd of People and Environment in a Virtual City Space," The Journal of the Institute of Electrical Engineers of Japan, The Institute of Electrical Engineers of Japan, Jan. 20, 1995, vol. 115, No. 2, pp. 212-221.
Notice of Reasons for Refusal, Japanese Patent Office, mailed Jun. 13, 2006 (4 pages).

*Primary Examiner*—Kimbinh T. Nguyen
(74) *Attorney, Agent, or Firm*—Finnegan, Henderson, Farabow, Garrett & Dunner, L.L.P.

(57) ABSTRACT

The present invention provides a picture processing device capable of realizing the detailed shape and pattern of a display object which is far away from a viewpoint and which attracts a game player's attention. For example, a display object (or player) in a soccer game is composed of a small number of polygons to be displayed on a CRT-type display, etc. when the display object is far away from the viewpoint (or camera position). However, even if the player is at a far position, the player will attract the game player's attention when a ball is passed to the player. If the number of polygons composing the player is small in such a situation, the game player will gain an unnatural impression. For example, assuming that a ball rolls to a certain player and this player obtains priority, a priority mark will be displayed above the player's head. Then, it is determined whether or not the player with the priority mark is close to a certain viewpoint. If the player is close to the viewpoint, no change will be made because the player is already composed of many polygons. On the other hand, if the player is far away from the viewpoint, the number of polygons composing the player will be increased to be almost the same as the number of polygons composing other players located close to the viewpoint.

24 Claims, 18 Drawing Sheets

FOREIGN PATENT DOCUMENTS

| | | |
|---|---|---|
| JP | 60-217461 | 10/1985 |
| JP | 3-296176 | 12/1991 |
| JP | 5-165921 | 7/1993 |
| JP | 5-265443 | 10/1993 |
| JP | 7-65194 | 3/1995 |

* cited by examiner

FIG. 9
(a)
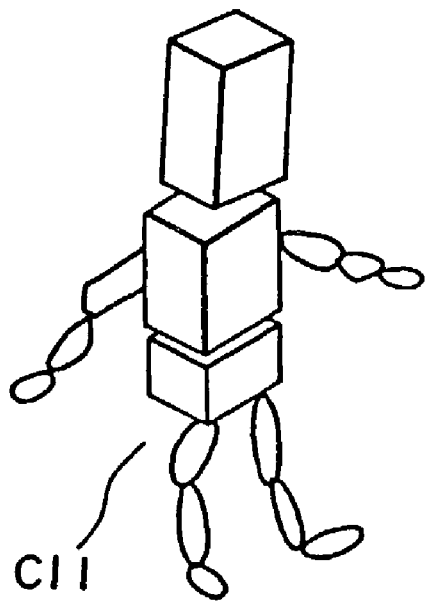
C11
(b)
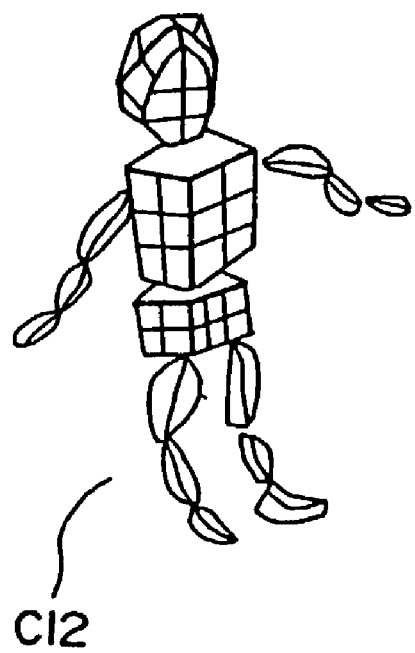
C12

PICTURE PROCESSING DEVICE, PICTURE PROCESSING METHOD, AND GAME DEVICE AND STORAGE MEDIUM USING THE SAME

This is a division of application Ser. No. 08/765,328, filed May 1, 1997, which is incorporated herein in its entirety by reference now U.S. Pat. No. 6,542,155.

TECHNICAL FIELD

The present invention relates to a picture processing device, which displays display objects composed of a plurality of elements (for example, polygons), a picture processing method, and a game device and storage medium using the same.

BACKGROUND ART

With the progress of computer graphics technology in recent years, picture processing devices, such as game devices and simulation devices, which are capable of displaying images in a three-dimensional space have been provided. Display objects (or characters) on displaying means are composed of polygons. Polygons herein used mean polygons (mainly triangles or quadrangles) which are made of an aggregate of plural vertexes.

A conventional picture processing device has limitations on the number of polygons handled by its central processing unit (CPU). Accordingly, a character located far away from a viewpoint is composed of a small number of polygons, while a character located close to the viewpoint is composed of a large number of polygons because the pattern and shape of the character have to be realized in detail (First Prior Art Example).

Moreover, a character in, for example, a soccer game is sometimes expressed with polygon data to which a texture mapping is applied. In this case, textures with players' numbers written for each different team uniform are prepared as many as the number of players (Second Prior Art Example).

Furthermore, in a conventional picture processing device, characters on a screen of displaying means are displayed with the same brightness regardless of the distance from a viewpoint (Third Prior Art Example).

In addition, when characters composed of polygons are displayed by a conventional picture processing device, a virtual viewpoint (or camera) is prepared in a three-dimensional coordinate system and an image of these characters taken by this viewpoint are displayed. In order to diversify the three-dimensional display of the characters, a plurality of cameras are prepared as in a game called "Virtua Fighter" and these cameras are switched to display the characters on the displaying means (Fourth Prior Art Example).

In the case of a game device (or picture processing device) of a soccer game, when a player which is a related display object turns around to protect a ball, which is a specific display object, and proceeds to the next action, it is necessary to operate an operation terminal in order to make the positions of the ball and the player coincide with each other (Fifth Prior Art Example).

Moreover, in the case of a conventional game device, details of general operations of an operation terminal are previously indicated on a housing (Sixth Prior Art Example).

In the First Prior Art Example, as explained above, a character far away from a viewpoint is always composed of a smaller number of polygons than those of a character close to the viewpoint. Accordingly, when a player (or character) which receives a pass in a soccer game attracts a game player's attention, for example, if the player is far from the viewpoint and is a character composed of a small number of polygons, the player is expressed merely in a monotonous shape and pattern. With this type of game device, the game player's attention is lowered and the game lacks a delicate taste. Such a game device is poorly attractive to consumers.

In the Second Prior Art Example, data with the aforementioned texture mapping applied should be prepared for all players. The priority of polygons is generally decided based on which polygon is located further back (in a z-axis direction). In this case, however, both the uniform and the player's number are located at the same position. Therefore, it is impossible to always place the player's number over the uniform with certainty by simply laying one over another. If a flag control is utilized to always set the player's number over the uniform, even if the player faces front and the player's number should not be seen, the player's number is placed over the uniform. Accordingly, there is no way but to prepare a texture of the uniform with the player's number written, knowing that the data volume will increase. This imposes a considerable computation load on CPU and, therefore, there is a possibility that the processing of CPU may be delayed, thereby diminishing a realistic excitement of a game. Otherwise, if a CPU capable of processing a large computation load is adopted, it costs too much.

In the Third Prior Art Example, since the characters are displayed with the same brightness regardless of the distance from a viewpoint, a game player cannot experience a feeling of far and near sufficiently.

In the Fourth Prior Art Example, even though there are a plurality of cameras, the positions of these cameras are fixed. Therefore, diversification of image expression cannot be fully achieved. Particularly, for a game such as a soccer game in which a player who takes control over a ball changes every moment and the superiority of the game accordingly changes in an instant, there is an disadvantage in that a full view of the game cannot be displayed effectively if the viewpoints are fixed.

In the Fifth Prior Art Example, a high-grade operation is required in order for a player to control a ball effectively. For this purpose, a game player needs to become fully skillful in the operating means of the game. It is difficult for an unskillful game player to control the game in order to have a player control a ball tactfully.

In the Sixth Prior Art Example, it is impossible to indicate the content of all the operations on a housing, depending on the content. If the content of all the operations should be indicated on the housing, it is difficult for the game player to read and memorize it in advance.

In conclusion, any of the above prior art examples provides poorly interesting expressions of characters and the characters are expressed insufficiently in relation to the operational performance.

Accordingly, an object of the present invention is to provide a picture processing device which is capable of richly expressing a displayed picture including the display objects (such as characters and background) of the above-described prior art examples, and of controlling the display objects diversely in relation to the operation.

A second object of the invention is to provide a picture processing device which is capable of realizing a detailed shape and pattern of a display object which attracts a game player's attention even when the display object is far away from a viewpoint.

A third object of the invention is to provide a picture processing device which is capable of displaying many display objects with a small computation load.

A fourth object of the invention is to provide a picture processing device which is capable of realizing the far and near expression in a displayed picture effectively.

A fifth object of the invention is to provide a picture processing device which is capable of displaying a full view of the results of the picture processing effectively.

A sixth object of the invention is to provide a picture processing device which is capable of smoothly controlling and displaying the movement of a related display object in relation to a specific display object without any special skill required.

A seventh object of the invention is to provide a game device which is capable of giving only a minimum necessary description to a housing, and of displaying other operating methods of a operation terminal in an easily recognizable manner.

DISCLOSURE OF THE INVENTION

This invention is a picture processing device for expressing a display object by composing it of a plurality of elements, comprising:

picture processing means for changing the number of the elements according to the distance between a viewpoint and the display object and for projecting the display object in a three-dimensional space onto a plane on the basis of the viewpoint; and element number changing means for changing the number of the elements which compose the display object when attributes of the display object far away from the viewpoint change.

According to this invention, the picture processing means decreases the number of the elements as the display object moves farther away from the viewpoint.

According to this invention, the element number changing means performs its processing when it determines that the display object has become the object of operation and, therefore, the attributes of the display object have changed.

According to this invention, the element number changing means comprises:

means for determining necessity of increase in the number of elements, which determines whether or not the number of the elements of the display object should be increased;

attribute determining means for determining whether or not the display object has become the object of operation; and element number calculating means for calculating the necessary number of elements on the basis of the determination results of the attribute determining means.

According to this invention, the display objects comprise a plurality of first display objects and a second display object having some relationship with the plurality of first display objects in a three-dimensional space, and when the plurality of first display objects compete with each other for control over the second display object, the attribute determining means determines that one of the plurality of first display objects which has gain control over the second display object is the object of operation.

According to this invention, the attribute determining means comprises:

order determining means for determining the order on the basis of the distance between the plurality of first display objects and the second display object;

first control granting means for finding a moving direction of a first display object having the highest order among the plurality of first display objects and for granting control to the first display object when the first display object moves toward the second display object; and second control granting means for granting control to a first display object having the second highest order among the plurality of first display objects when the first display object having the highest order is not moving toward the second display object.

This invention comprises attribute indicating means for giving a mark to the display object having control.

This invention comprises:

operating means for outputting operation signals to the display object; and displaying means for displaying the display object.

This invention is a picture processing method for expressing a display object by composing it of a plurality of elements, comprising:

picture processing step of changing the number of the elements according to the distance between a viewpoint and the display object and of projecting the display object in a three-dimensional space onto a plane on the basis of the viewpoint; and element number changing step of changing the number of the elements which compose the display object far away from the viewpoint when attributes of the display object change.

If a display object is displayed on the displaying means as if the display object is located far away from a viewpoint, for example, this invention increases the number of elements (for example, polygons) of the display object when the display object becomes the object of operation on the basis of operation signals sent from the operating means. Accordingly, the display object which attracts a game player's attention begins to be expressed in detail at that time. Also, since the number of polygons of the display object which attracts the game player's attention is increased, the expression of the displayed picture including the display object becomes rich and it is possible to control the display object in various situations in relation to the operation.

This invention is a picture processing device for expressing a display object by adding a plurality of mutually different elements, comprising:

common element applying means for expressing a part or all of a plurality of the displaying objects by using common elements;

individual element applying means for expressing the display objects by applying a plurality of individual elements, which are different from each other, respectively to the plurality of display objects expressed by the common element applying means; and picture processing means for projecting the display objects expressed by the common element applying means and the individual element applying means, onto a plane on the basis of a viewpoint.

According to this invention, a part of the display object expressed by the common element applying means is missing and the individual element is set in this missing portion.

According to this invention, a plurality of the individual elements have respectively different patterns.

According to this invention, a plurality of the individual elements have respectively different shapes.

According to this invention, the individual element applying means applies and places plural types of individual elements one over another.

According to this invention, the types of the individual elements include a ground element, a pattern element and a number element.

This invention comprises:

operating means for outputting operation signals to the display object; and displaying means for displaying the display object.

This invention is a picture processing method for expressing a display object by adding a plurality of mutually different elements, comprising:

common element applying step of expressing a part or all of a plurality of the displaying objects by using common elements;

individual element applying step of expressing the display objects by applying a plurality of individual elements, which are different from each other, respectively to the plurality of display objects expressed by the common element applying step; and picture processing step of expecting picture processing to project the display objects expressed by the common element applying step and the individual element applying step, onto a plane on the basis of a viewpoint.

According to this invention, when the display objects have different patterns, a plurality of elements (for example, polygons) with respective patterns are prepared for such different pattern portions. Moreover, at least a part of the elements of the display objects, other than the pattern portions, is made common. By combining both portions to complete the display objects with different patterns, it is possible to produce with a small number of polygon data a picture of plural display objects having different patterns. Therefore, this invention makes it possible to display many display objects with a small computation load.

This invention is a picture processing device for expressing a display object by composing it of a plurality of elements, comprising:

picture processing means for projecting the display object in a three-dimensional space onto a plane on the basis of a viewpoint; and coloring means for coloring the display object according to the situation of the display object.

According to this invention, the coloring means changes the color of the display object in accordance with the number of elements composing the display object.

According to this invention, the coloring means changes the color of the display object in accordance with the distance between the display object and the viewpoint.

According to this invention, the coloring means changes the color of the display object in accordance with the color of a background of the display object.

According to this invention, the coloring means changes color brightness.

This invention comprises:

operating means for outputting operation signals to the display object; and displaying means for displaying the display object.

This invention is a picture processing method for expressing a display-object by composing it of a plurality of elements, comprising:

picture processing step of projecting the display object in a three-dimensional space onto a plane on the basis of a viewpoint; and coloring step of coloring the display object according to the situation of the display object.

This invention displays the display objects in a three-dimensional coordinate system on the displaying means on the basis of a viewpoint. At this point, the color of the display objects is changed according to the situation of the display objects. For example, the display object located close to the viewpoint on the displaying means is displayed with brighter color than that of the display object far away from the viewpoint. Thus, it is possible to give a strong feeling of near and close to the game player and to richly express the displayed picture including the display objects. In addition, since the displayed picture with rich expressions is realized, it becomes easy to control the display objects in various situations in relation to the operation.

This invention is a picture processing device for expressing a display object by composing it of a plurality of elements, comprising:

picture processing means for projecting the display object in a three-dimensional space onto a plane on the basis of a viewpoint; and viewpoint position changing means for moving the position of the viewpoint.

According to this invention, the viewpoint position changing means moves the viewpoint closer to the display object when the display object attracts a user's attention.

According to this invention, the viewpoint position changing means moves the viewpoint along at least two coordinate axes of the three-dimensional coordinate system.

This invention comprises:

operating means for outputting operation signals to the display object; and displaying means for displaying the display object.

This invention is a picture processing method for expressing a display object by composing it of a plurality of elements, comprising:

picture processing step of projecting the display object in a three-dimensional space onto a plane on the basis of a viewpoint; and viewpoint position changing step of moving the position of the viewpoint.

According to this invention, the picture processing means is provided with the viewpoint position changing means. This viewpoint position changing means is capable of moving the viewpoint along, for example, at least two coordinate axes of the three-dimensional coordinates, and of giving an angle to the viewpoint against a certain display object. If a display object is the ground (or background) of a soccer game, for example, movement of the viewpoint in two directions makes it possible to realize the position to move back and forth on the ground and the position with changing angles against the ground. Consequently, it is possible to display a full view of a game according to the circumstances of the game and to provide a game player with a highly realistic excitement. Moreover, it is possible to richly express the displayed picture including the display objects. Furthermore, since the rich expression of the displayed picture is realized, it becomes easy to control the display objects in various situations in relation to the operation.

This invention is a picture processing device for expressing a display object by composing it of a plurality of elements and for expressing a related display object in relation to the display object, comprising:

storage means for storing a plurality of forms given to the display object;

form processing means for realizing a plurality of forms, which are stored in the storage means, on the display object successively;

correcting means for correcting the form of the display object on the basis of the relationship with the related display object; and picture processing means for projecting the display object, the form of which is corrected by the correcting means, onto a plane on the basis of a viewpoint.

According to this invention, the correcting means comprises:

first means for operating stop positions toward which the display object and the related display object respectively move; and second means for controlling the form read out from the storage means so that the stop position of the related display object conform to the stop position of the display object.

According to this invention, the correcting means corrects the position or moving direction of the display object.

This invention comprises:

operating means for outputting operation signals to the display object; and displaying means for displaying the display object.

This invention is a picture processing method for expressing a display object by composing it of a plurality of elements and for expressing a related display object in relation to the display object, comprising:

form processing step of realizing a plurality of forms, which have been previously given to the display objects, on the display object successively;

correcting step of correcting the form of the display object on the basis of the relationship with the related display object; and picture processing step of projecting the display object, the form of which is corrected by the correcting means, onto a plane on the basis of a viewpoint.

This invention operates a stop position toward which the specific display object moves, makes the related display object conform to the operation results, and adjusts the movements of the related display object, for example, the movement amount on the screen in each scene of the movements, so that a series of movements of the related display object may be reproduced in order to preferably make the movements of the related display object correspond with the operation results. Accordingly, the stop position of the specific display object corresponds with the stop position of the related display object. Therefore, it is possible to control the related display object so that it smoothly moves in relation to the specific display object. Thus, it becomes easy to control the display objects in various situations in relation to the operation.

This invention is a game device, comprising:

operating means for operating a display object;

picture processing means for executing picture processing in accordance with operation signals sent from the operating means; and displaying means for displaying the results of picture processing by the picture processing means, wherein the game device comprises any of the above-described picture processing devices.

This invention is a game device, comprising:

operating means for operating a display object;

picture processing means for executing picture processing in accordance with operation signals sent from the operating means; and displaying means for displaying the results of picture processing by the picture processing means, wherein a description is previously indicated concerning a part of the operations of the operating means.

This game device further comprises operation content outputting means for displaying the content of operation on the displaying means when the picture processing executed by the picture processing means needs to perform the operation other than the operation concerning which the above-mentioned description is indicated.

According to this invention, the operation content outputting means displays the content of operation at a position not overlapping with the position of the display object which is to be operated.

According to this invention, when the operation, other than the operation concerning which a description about the picture processing to be executed by the picture processing means is indicated, is required, the content of such operation is indicated on a part of the displaying means. For example, in a special case such as throwing in a soccer game, the content of the operation for throwing is displayed on the displaying means. Operation terminals which can be used for this purpose and other details of the operation are indicated. Accordingly, the game player does not have to read all the descriptions before starting a game and can easily understand the operating method because a necessary description is indicated every time some operation is required. Moreover, since it is possible to display the display objects in various situations in relation to the operation, the displayed picture is expressed richly and it is possible to control the display objects in various situations in relation to the operation.

This invention is a storage medium for storing the procedures for having a processing device execute any of the above-described methods. This storage medium may include, for example, a floppy disk, magnetic tape, photomagnetic disk, CD-ROM, DVD, ROM cartridge, RAM cartridge with battery back-up, and nonvolatile RAM cartridge. The storage medium stores information (mainly digital data and programs) by some physical means and is capable of having a processing device such as computers and private processors perform a certain function.

In conclusion, any of the above inventions realizes very interesting expressions of characters and diversifies and enriches the expressions of characters in relation to the operational performance.

BRIEF DESCRIPTION OF THE DRAWINGS

FIG. 9 describes a polygon increase of the first embodiment of this invention.

BEST MODE FOR CARRYING OUT THE INVENTION

The best mode for carrying out the present invention is hereinafter explained with reference to the drawings.

Figure 1:
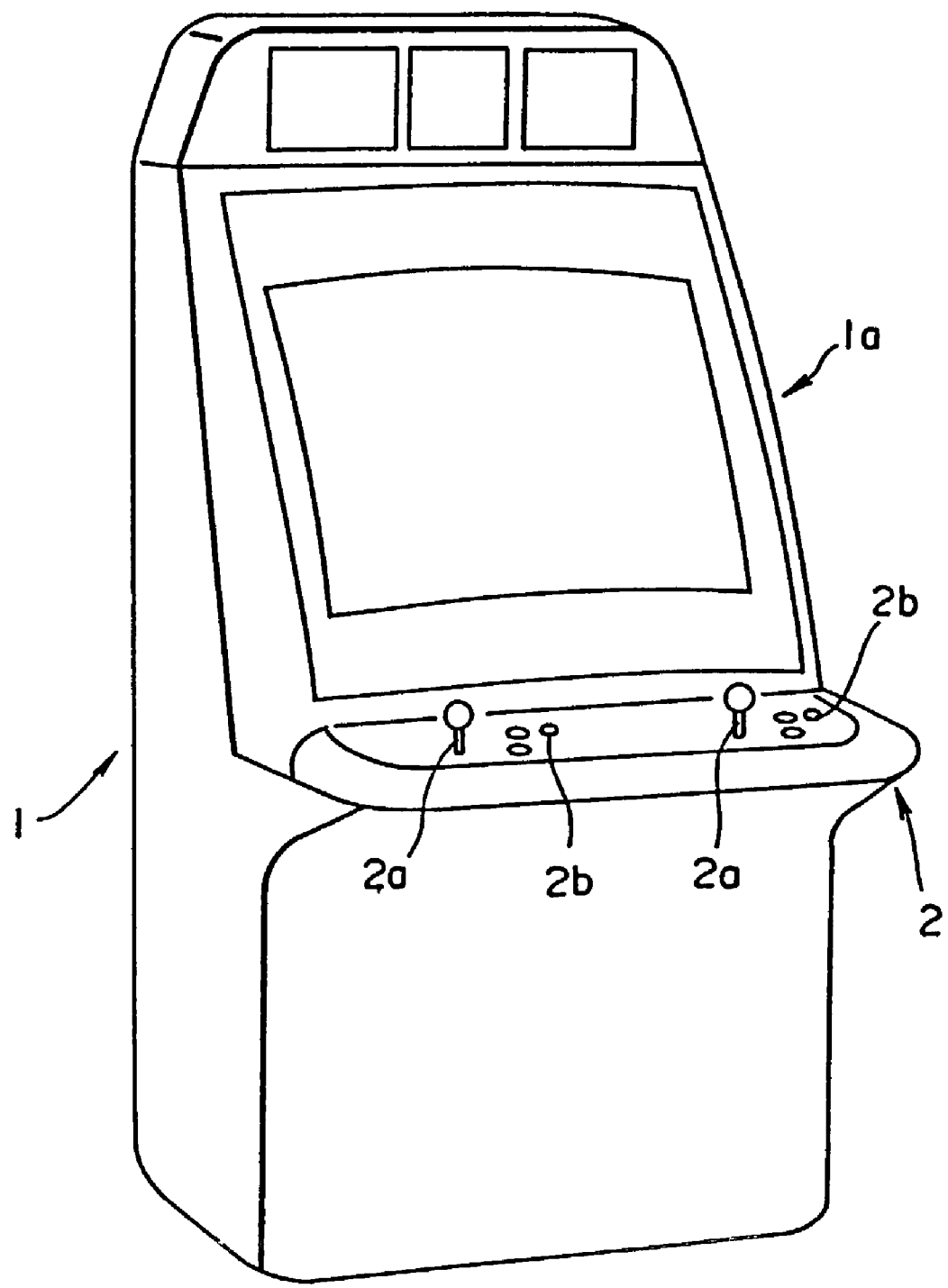
FIG. 1 is a full perspective view of one embodiment of the present invention.

FIG. 1 is an exterior view of the video game machine employing the picture processing device of an embodiment of the present invention. According to this figure, housing 1 is in a substantial box shape, and game processing substrates and the like are provided within housing 1. On the front face of housing 1, a CRT-type display 1a and an operation panel 2 are provided. Joysticks 2a and 2a and sets of operation buttons 2b and 2b, each set respectively consisting of three buttons, are provided on the operation panel 2. Display 1a displays a game screen. Three-dimensional pictures are developed on the game screen, and a game player is capable of freely moving players (or characters) on the screen by operating joystick 2a, etc. Such characters are one of the display objects.

Figure 2:
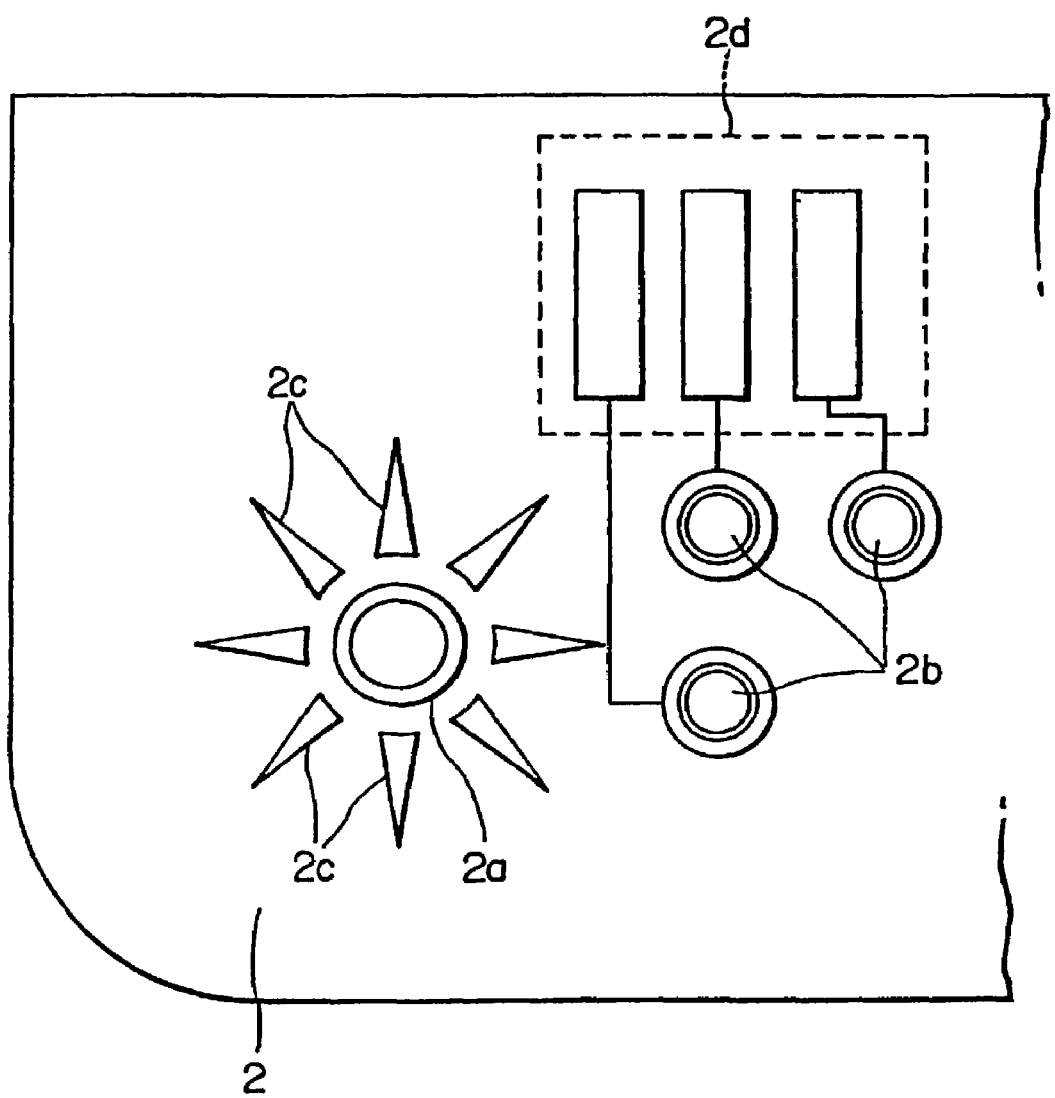
FIG. 2 is a plan view of an operation panel of the first embodiment of this invention.

FIG. 2 is an enlarged view of the operation panel of the first embodiment. In this figure, operating directions 2c are indicated around joysticks 2a and 2a on the operation panel 2. Operating directions 2c are provided at 45° intervals around joystick 2a. In other words, there are eight operating directions 2c. Furthermore, the operation panel 2 with the operation buttons 2b mounted thereon also has descriptions 2d of normal operation content for the respective operation buttons 2b.

Figure 3:
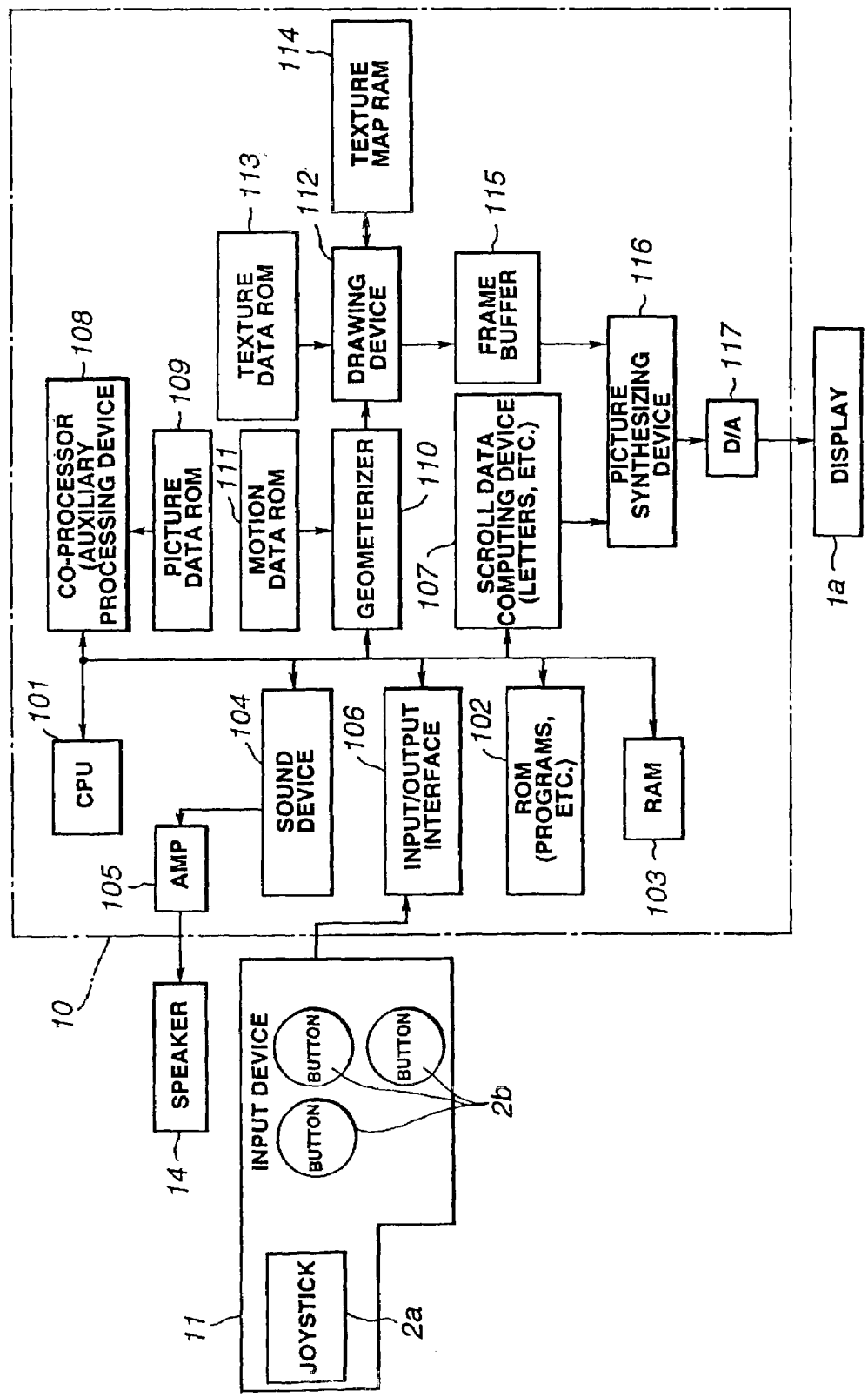
FIG. 3 is a block diagram showing the structure of a signal processing system of the picture processing device of the first embodiment of this invention.

FIG. 3 is a block diagram of the game device employing the picture processing device of the first embodiment. This game device comprises, as its basic elements, a main game device 10, input device 11, speaker 14 and a CRT-type display 1a.

The input device 11 has joystick 2a and operation buttons 2b consisting of a set of three buttons. As shown in FIG. 1, there may be a plurality of the input devices 11.

The CRT-type display 1a displays pictures of a soccer game or the equivalent executed by this game device. A projector may be used instead of this CRT-type display 1a.

Speaker 14 generates music, sound effects or the like upon receiving signals from the main game device 10.

The main game device 10 comprises a CPU (central processing unit) 101, ROM 102, RAM 103, sound device 104, power amplifying circuit (AMP) 105, input/output interface 106, scroll data computing device 107, co-processor (auxiliary processing device) 108, picture data ROM 109, geometrizer 110, motion data ROM 111, drawing device 112, texture data ROM 113, texture map RAM 114, frame buffer 115, picture synthesizing device 116, and D/A converter 117. The motion data means three-dimensional data such as "polygon data forming a combination of a series of movements performed by characters such as players in each scene" and "background such as court, spectators and constructions."

CPU 101 is connected to ROM 102, which stores predetermined programs and the like via bus lines, RAM 103 for storing data, sound device 104, input/output interface 106, scroll data computing device 107, co-processor 108 and geometrizer 110.

RAM 103 functions as the RAM for the buffer, so various commands to geometrizer 110 are written thereon.

The input/output interface 106 is connected to the input device 11, thereby operation signals of joystick 2a of the input device 11 are taken in CPU 101 as digital quantity. The sound device 104 is connected to speaker 14 via the power amplifier 105, and sound signals generated by the sound device 104 are amplified by the power amplifying circuit 105 and then given to speaker 14.

According to the this embodiment, CPU 101 is designed to read, based on the program installed inside ROM 102, the operation signals from the input device 11 and the image data from ROM 109, or the motion data from the motion data ROM 111, and to determine at least, among others, whether or not a player (or related display object) and a ball (or specific display object) collide (or contact) with each other, and whether or not players collide with each other.

Co-processor 108 is connected to the picture data ROM 109, and then, predetermined camera position changing data are delivered to co-processor 108 (and CPU 101). Co-processor 108 is designed mainly to make a contact determination, such as a contact between the ball and the player and a contact between the player and the player, and to assume mainly the operation of floating points during this determination. As result, the determination of contact between the player and the ball is performed by co-processor 108, and the determination results are given to CPU 101, thereby reducing the computation load on CPU and enabling more rapid performance of this contact determination.

After the coordinates of the display object (such as players and ball) are determined in a three-dimensional space, a conversion matrix for converting these coordinates into a visual field coordinate system, and data regarding the players, goals and referees are designated to geometrizer 110. Geometrizer 110 is connected to the motion data ROM 111 and the drawing device 112. The motion data ROM 111 has previously stored thereon the polygon motion data, i.e., three-dimensional data such as data concerning players, ball, court, partial background (such as spectators), respectively composed of vertexes (or polygons). This motion data is delivered to geometrizer 110. Geometrizer 110 radioscopically converts the picture data designated by the conversion matrix and sent from CPU 101, thereby obtaining data converted from the coordinate system of the three-dimensional virtual space to the visual field coordinate system.

The drawing device 112 pastes textures onto the picture data which has been converted into the visual field coordinate system, and outputs such data to the frame buffer 115. In order to paste the textures, the drawing device 112 is connected to the texture data ROM 113 and the texture map RAM 114, and also to the frame buffer 115. Polygon data means a group of data of relative or absolute coordinates of respective vertexes of polygons (polygons: mainly triangles or quadrangles) which are made of an aggregate of a plurality of vertexes. The picture data ROM 109 may store polygon data, which are set comparatively rough to satisfy the performance of the determination of contact between players and between a player and a ball, and position changing data required for camerawork. In contrast, the motion data ROM 111 stores polygon data which are set in more details relating to motions constructing pictures including the players, ball, background, etc.

The Scroll data computing device 107 computes scroll picture data such as letters and parts of the background (such as sky). This computing device 107 and the above-mentioned frame buffer 115 are connected to the CRT-type display 1a via the picture synthesizing device 116 and D/A converter 117. This allows the polygon picture, including players, court, ball, background (partially), which is temporarily stored in the frame buffer 115, and the scroll picture with letter information, such as score, remaining game time, usage of the operation button 2b and other necessary guidance, to be synthesized in accordance with a designated priority, thereby generating a final frame picture data. This picture data is converted by D/A converter 117 into analog signals and sent to the CRT-type display 1a, and the soccer game picture is displayed on a real time base.

Next, movements of the embodiments of the present invention will be explained on the basis of FIGS. 1 through 3 and with reference to the drawings of FIGS. 4 through 23.

[Explanation of Main Processing Routine]

Figure 4:
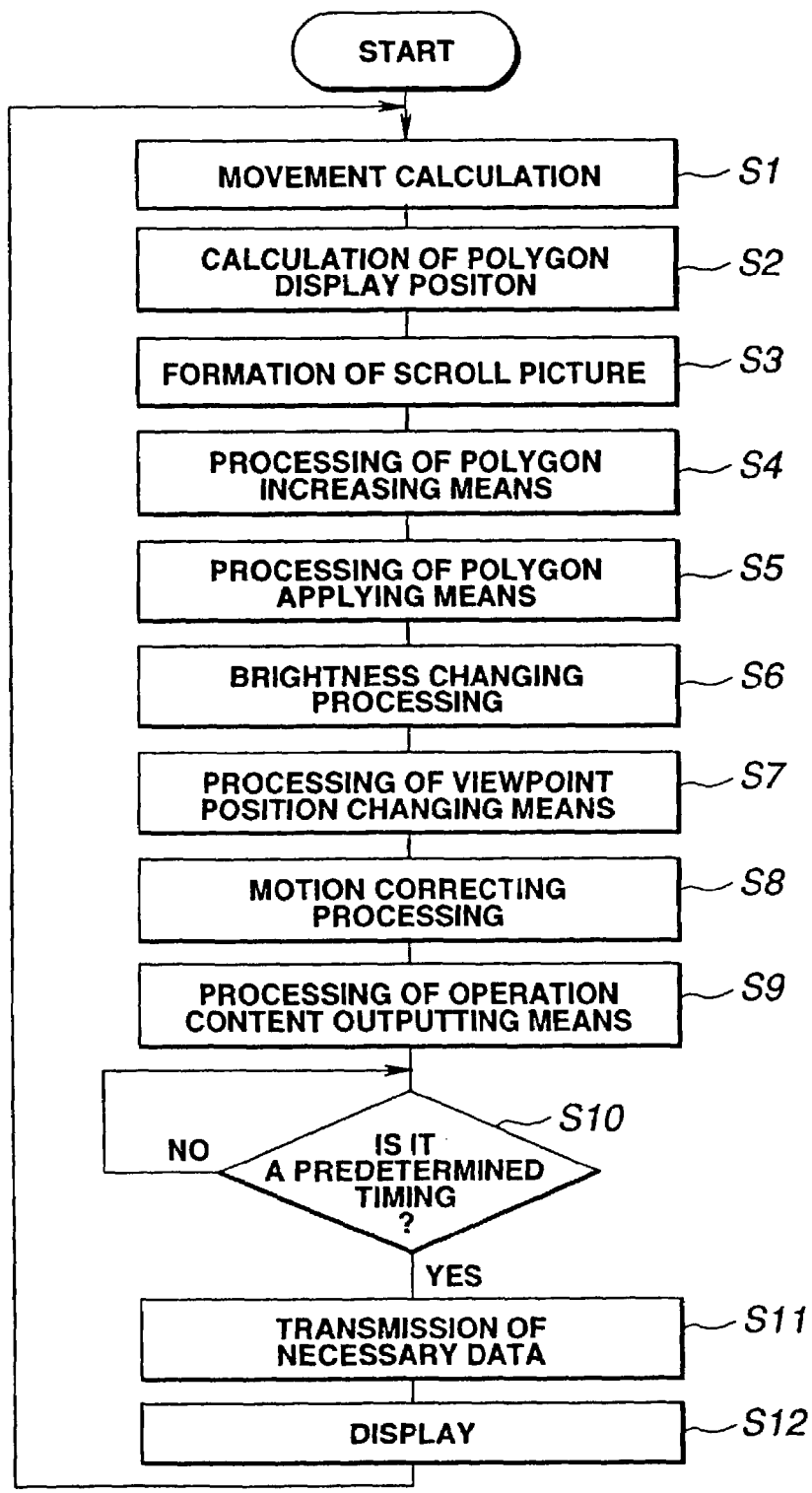
FIG. 4 is a main flowchart which explains actions of the first embodiment of this invention.

First, the overall flow of movements is explained by using the main flow chart in FIG. 4. For convenience of explanation, the contents of a game to be processed by the game device according to the present embodiment shall be a soccer game. One team will be basically composed of eleven players, and a game will be performed by two teams kicking a ball into the goal of the other team on a court.

The main CPU 101 performs the processing according to the main flow chart in FIG. 4, and a synchronous display control processing is performed concerning the picture with characters and the like to be expressed with the three-dimensional polygon data (hereinafter referred to as "polygon picture") and the scroll picture with a part of the background and letter images, as described above.

At step S1 of FIG. 4, the main CPU first calculates movement coordinates of the viewpoint in correspondence with the operation state of joysticks 2a and the operating buttons 2b, and the movement coordinates of characters and the like to be expressed with textured polygon data. This processing allows movements of a soccer player, such as running on the screen in the direction instructed by the game player.

Next, at step S2, position data (or screen coordinates), etc. on the screen, where the three-dimensional polygon data with the converted coordinates are displayed, are calculated. Based on the polygon display position, players and other characters are displayed at the predetermined position on the screen in the predetermined form.

Then, the processing proceeds to step S3 and prepares scroll data of the sky and scores, etc. The scroll data means the portions which do not move by themselves, such as backgrounds and the like. These scroll data are synthesized with the polygon pictures which move around the screen and then the synthesized picture is displayed on display 1a.

At step S4, a processing of polygon increasing means of the first embodiment described below is performed. The polygon increase processing means the processing to increase the number of polygons composing a character which attracts the game player's attention, such as a player which has received the ball.

Next, at step S5, a processing of polygon applying means of the second embodiment described below is performed. The polygon applying processing means, for example, that when a player's number is to be expressed on the back of a player, a separate polygon for the player's back number is prepared in addition to the polygons composing the player and these polygons are synthesized, thereby expressing the player's number.

At step S6, a brightness changing processing is performed to change the brightness in correspondence with the distance between the characters and the viewpoint according to the third embodiment described below. The brightness changing processing means the process to change the brightness of the character in correspondence with the distance between the character and the viewpoint. By means of this brightness changing processing, a player close to the camera is displayed in bright colors and a player far from the camera is displayed in dark colors.

At step S7, a processing of viewpoint position changing of the fourth embodiment described below is performed. The viewpoint position changing means the process, for example, when a player has obtained the ball and starts to dribble, to move the camera viewpoint gradually from a high position to a low position and to display the dribbling player in a close-up view.

At step S8, a motion correcting processing of the fifth embodiment described below is performed. The motion correcting processing prevents unnatural movements, for example, in a series of movements when the dribbling player turns around. For example, the motion correcting processing corrects the position or moving direction of the ball so that the player and the ball do not seem to be separated from each other.

At step S9, a processing of operation content outputting means of the sixth embodiment described below is performed. The operation content outputting processing means the process to display the operation description in cases where the game player needs to perform special operations during a game. Special operations include, for example, free throw and free kick.

Finally, all the results executed at steps S1 through S9 are temporarily stored in the frame buffer 115, Ram 103, etc.

After passing through all of the above-mentioned processing, the main CPU 101 waits for and determines the predetermined timing to draw the polygon data at step S10. When the predetermined timing has arrived, the movement amount along the x and y axes on the scroll picture and the multiplying factors, etc. which have been stored in memories or the like are transferred to the picture synthesizing device 116 at step 11. Then, at step S12, the main CPU 101 executes commands of, for example, display. The main CPU regularly repeats the processing from step S1 to step S12, as described above.

[First Embodiment]

The action of the polygon increasing means which is the first embodiment of the present invention is hereinafter described with reference to FIGS. 5 through 8. This embodiment defines a certain viewpoint and pictures as seen from this viewpoint is displayed. On the screen, display objects close to the viewpoint are displayed in a large size and display objects far away from the viewpoint are displayed in a small size. The display objects which are displayed in a large size, especially players, are expressed with a large number of polygons, and the display objects which are displayed in a small size, such as players, are usually expressed with a small number of polygons.

Figure 5:
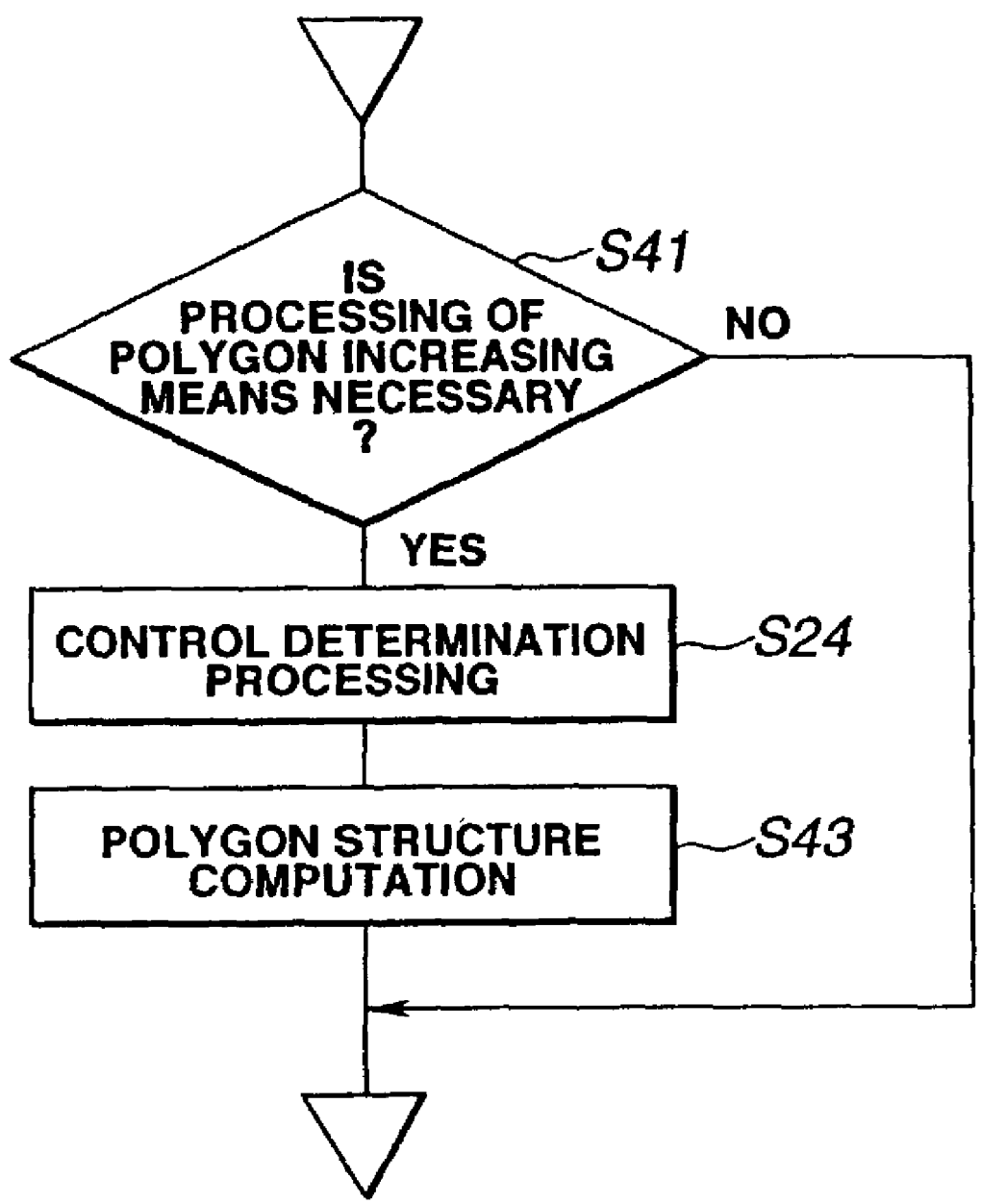
FIG. 5 is a flowchart which explains actions of the first embodiment of this invention.

In such a display indication state, step S4 of FIG. 4 is shown in detail in FIG. 5.

In FIG. 5, CPU 101 first determines whether or not the polygon increasing means is necessary at step S41. If this processing is not necessary (step S41: NO), the processing of this first embodiment is unnecessary, so steps S42 and S43 are skipped.

However, if CPU 101 determines that this processing is necessary (step S41: YES), the processing proceeds to step S42. Cases where the processing at this step is required are as follows:

(1) When a certain player which is far from the viewpoint is expressed with a small number of polygons and the ball flies to a position close to this player. The processing is required in this case in order to avoid unnaturalness, as the game player pays attention to the player near the ball.

(2) Other cases where the game player is thought to pay attention to players, regardless of a far distance from the viewpoint, for example, when the players are exchanged.

In case (1), under the control of CPU 101, it is determined whether or not this player will obtain control over the ball (at step S42). When the specific player has won the control over the ball (at step S42), the polygon increasing means performs the processing to increase the number of polygons composing the player (at step S43).

Figure 6:
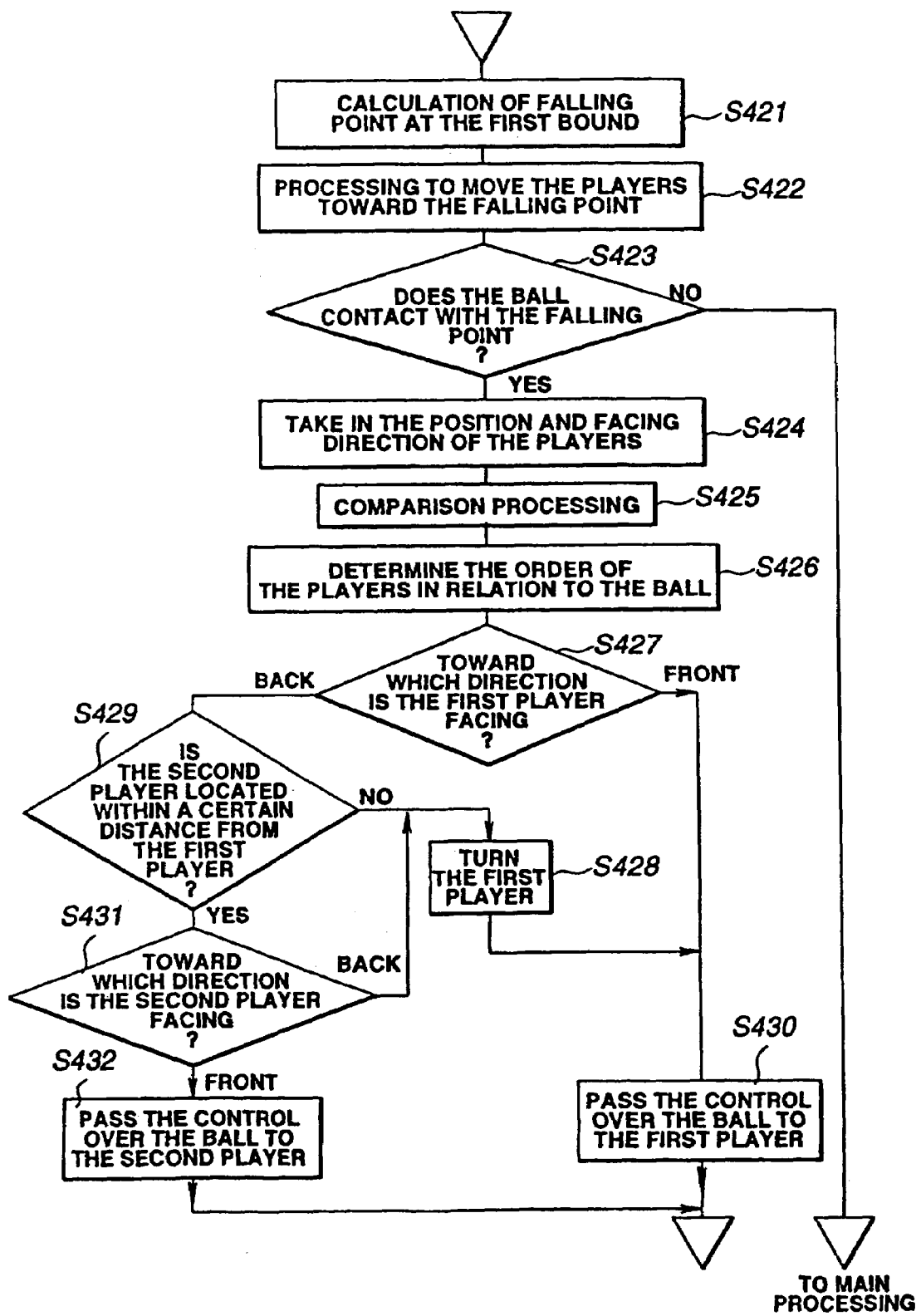
FIG. 6 is a detailed flowchart of the priority determination at step S42 "Control Determination Processing" of the flowchart in FIG. 5.
Figure 7:
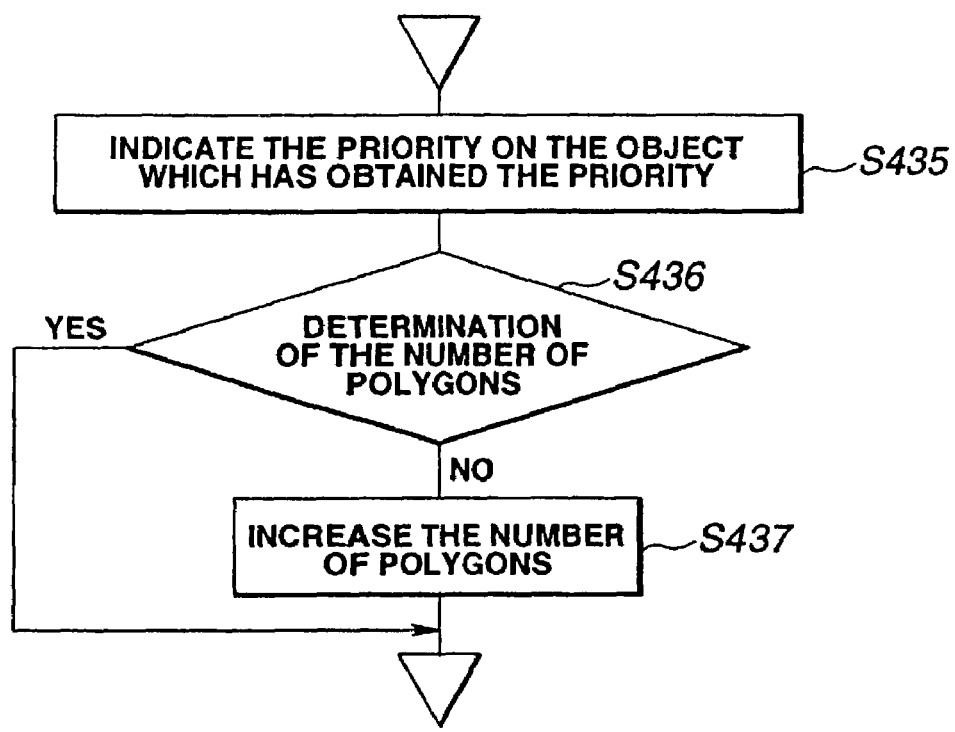
FIG. 7 is a detailed flowchart of the polygon increase processing at step S43 "Polygon Structure Computation" of the flowchart in FIG. 5.

The acquisition of control (at step S42) is hereinafter explained by referring to FIGS. 6 and 7. In other words, this processing determines, as the ball flies through the air, which one of the players among the plurality of players located far from the viewpoint has obtained control over this ball.

This processing starts when the ball starts flying through the air. For example, at step S421, the estimated position where the ball bounds for the first time is calculated.

Then, at step S422, the player near this position is made to move toward this position.

Subsequently, at step S423, it is determined whether or not the ball has contacted with the estimated position of the first bound. If the ball does not contact this position (step S423: NO), this processing is skipped and one proceeds to the main processing. Furthermore, if the ball does contact this position (step S423: YES), the position and direction of each player are taken in (at step S424).

At step S425, the moving direction of the ball and the distance between each player and the ball are calculated.

At step S426, the player nearest to the ball (this player shall be referred to as the "first player" in FIG. 6) and the player located at the second nearest position to the ball (this player shall be referred to as the "second player" in FIG. 6) are determined.

Next, at step S427, the facing direction, in relation to the ball, of the player nearest to the ball is determined. If the player nearest the ball is generally facing the ball (step S427: FRONT), the control over the ball is given to the player nearest the player (at step S430).

However, if the player nearest to the ball faces toward a direction opposite to the ball (with his back to the ball) (step S427; BACK), it is determined whether or not the second nearest player to the ball is within a certain distance from the first player (at step S429). If it is determined at step S429 that the second player is not within such a certain distance (step 429: NO), since the first player can turn around and move toward the ball and reach at the ball faster than the second player, the first player is made to turn around at step S428. Thereafter, the control over the ball is given to the first player at step S430.

On the other hand, if the second nearest player to the ball is within a certain distance range from the first player (step S429: YES), it is necessary to determine which player is faster to reach the ball, the first player turning and moving toward the ball or the second player moving toward the ball. For this purpose, the facing direction of the second player is determined at step 431. If the second player faces the ball (step S431: FRONT), the second player can reach the ball faster than the first player turning and reaching the ball, so the control over the ball is given to the second player at step S432. If the second player is also facing backwards (step S205; BACK), the first player is turned (step S428).

These priority data are stored, for example, in RAM 103 or the like.

Figure 8:
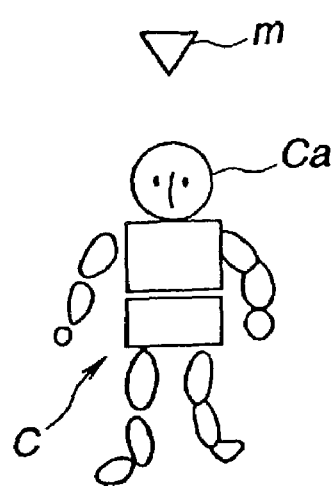
FIG. 8 describes a priority mark of the first embodiment of this invention.

As described above, concerning the player obtaining control over the ball, the processing to display a control mark above the player is performed at step S435. Thereby, the mark is displayed above the head Ca of player C on the CRT-type display la to show that the control over the ball has transferred to such player, as shown in FIG. 8.

Subsequently, the number of polygons of this player C is determined at step S436. If the polygon number of player C is large (step S436: YES), this player C is displayed as if it is located in foreground on the screen and, therefore, no change is made. If the number of polygons of this player C is small (step S436: NO), the number of polygons is increased to almost the same number of polygons composing the player displayed in foreground. Since this player C is displayed as if it is located far back in the screen (or far from the viewpoint), the player is composed of a small number of polygons.

As a result, player C11 composed of a small number of polygons as shown in FIG. 9(*a*) is then expressed in the same way as player C12 composed of a large number of polygons, as shown in FIG. 9(*b*).

In the example above, the number of polygons composing the player with the attention mark m is increased to almost the same number as that of a player close to the viewpoint, but there may be some other ways to determine the number of polygons. For example, the greatest number of polygons may be determined in advance depending on the size of the players on the screen, and the number of polygons composing the player with the attention mark m is increased to such a maximum value. Generally, the number of polygons composing a player is less than this maximum value. A thoughtless increase of the number of polygons composing a player which is displayed in a small size on the screen may be ineffective as it may be too detailed. Therefore, the optimum display becomes possible by adequately determining the maximum value according to the size of the player and the distance between the player and the viewpoint.

Alternatively, a normal number of polygons may be previously decided in accordance with the size of the players on the screen and the number of polygons composing the player with the attention mark m may be made as the number obtained by multiplying this normal number of polygons by a factor k (k>1). This factor k may be a constant value or may be changed according to the size of the player on the screen or the distance between the player and the viewpoint.

Another alternative is to increase the number of polygons by adding or multiplying a predetermined value "a" to or by the number of polygons composing the player with the attention mark m. The value "a" to be added or multiplied may be a constant value or may be adequately set depending on the size of the player or the distance between the player and the viewpoint.

In conclusion, the number of polygons composing the player with the attention mark m should be increased to the extent that such display will not cause a sense of unnaturalness to the game player.

In the above explanations, the number of polygons composing the player close to the viewpoint is always large. However, without limitation, it is also possible to reduce the number of polygons according to the circumstances. This is explained below by using specific examples.

Let it be supposed that there are three opponents A, B and C before the player (or character) operated by the game player. The order of the opponents closer to the player shall be A, B and C. If the viewpoint is located close to the player, when looking at opponents A, B and C, opponent A is indicated as if it is located at the most front. Based on the principles above, the number of polygons composing opponent A is largest. Opponent B is indicated to be at the second closest position, and C at the farthest position. At this time, there is the following relationship between the opponents: (number of polygons composing A)>(number of polygons composing B)>(number of polygons composing C).

In this case, the player first struggles with the nearest opponent A. If the player wins over or removes A, it then struggles with B, and then with C. The first opponent to which the game player directs his attention is A. However, after winning over A, the game player naturally turns his attention to the next opponent B. At this point, the number of polygons composing A is largest, but as A is no longer of interest, it is meaningless to express A in detail. Therefore, the number of polygons composing the beaten opponent is reduced a little even if the opponent is close to the viewpoint. This prevents excessively detailed expression and reduces the computation load. The reduced number of polygons may be added to the polygons composing the next opponent B. The same applies to the processing of fighting with C after beating B.

In this way, the polygon increasing means of the first embodiment makes it possible to display a player, which is far from a certain viewpoint and, therefore, is composed of a small number of polygons, with almost the same number of polygons as the player displayed close to the viewpoint in cases where such player is considered to attract the game player's attention, for example, when the player takes the control over the ball. Accordingly, even if the player is far from the viewpoint, the player which attracts the game player's attention is given detailed shape and pattern, thereby providing a better display mode. Therefore, the game player will hardly feel unnaturalness.

According to this embodiment, it is possible to diminishing a processing load without giving a sense of unnaturalness to the game player by reducing the number of polygons composing a player which is close to the viewpoint and does not attract the game player's attention.

In conclusion, the number of polygons composing a player is decided according to its position, whether far from or close to the viewpoint, as a general rule. In this first embodiment, this rule is amended as appropriate in accordance with circumstances (for example, actual situation of a game, relationship with players, relationship with a ball, relationship with a background). Accordingly, the game player will not feel a sense of unnaturalness very often, and it is possible to diminish a processing load without giving a sense of unnaturalness to the game player by reducing the number of polygons.

[Second Embodiment]

In the second embodiment, when a character is a player of a soccer game, a predetermined portion of the player's back is hollowed out and this hollowed portion is filled with a ground, a uniform pattern and a player's number, all of which are respectively composed of polygons, in the order listed above. In this embodiment, polygon applying means executes this action.

The polygon applying means operates at step S5 of the main routine shown in FIG. 4. Details of this step S5 are described in FIG. 10.

Figure 10:
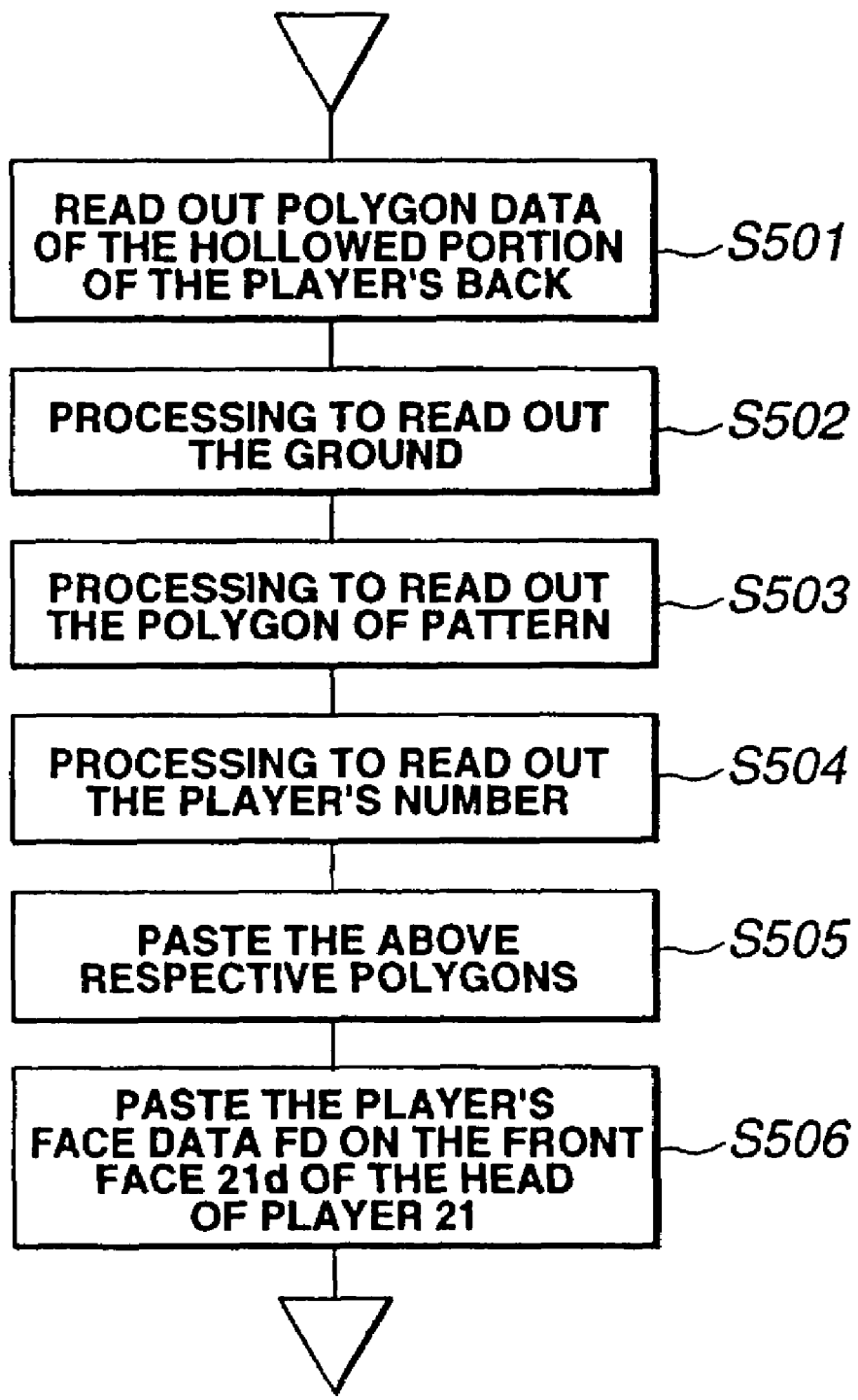
FIG. 10 is a flowchart which explains actions of a second embodiment of this invention.
Figure 11:
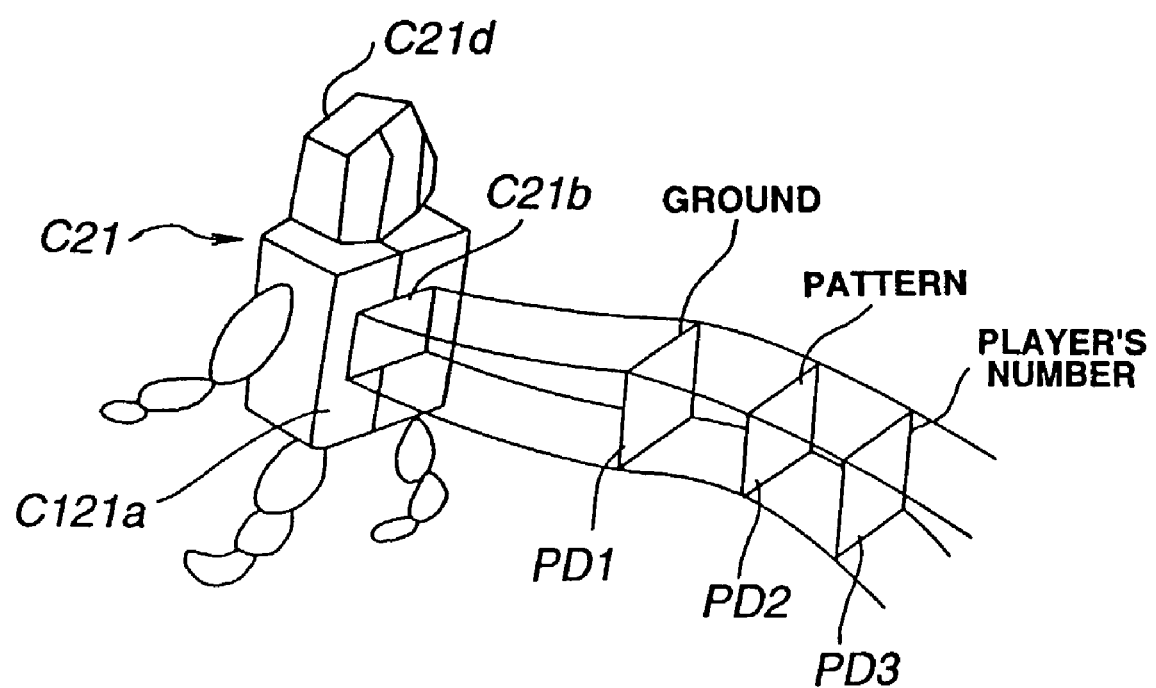
FIG. 11 describes an action of the second embodiment of this invention.

According to FIG. 10, at step S501, CPU 101 of the main game device 10 reads out polygon data of player C21 which is composed of a plurality of polygons in a manner such that a part C21b of the back C21a of player C21 is hollowed out as shown in FIG. 11. The back C21a of player C21 is composed of a plurality of polygons Pn1–Pn6. The read-out data do not contain polygon data corresponding to the portion C21b surrounded by polygons Pn1–Pn6. Accordingly, based on the polygon data read out at step S501, player C21 is treated as if a part C21b of its back C21a is hollowed out as shown in FIG. 11.

Next at step S502, polygon data PD1 to function as a ground is read out from the motion data ROM 111, etc. This polygon data PD1 fits in the hollowed part C21b and comprises a certain color data.

At step S503, polygon data PD2 with a pattern texture mapped thereon is read out. This polygon data PD2 corresponds to the above-mentioned hollowed part C21b and includes a color data to make the portion other than the texture transparent.

Subsequently, at step S504, polygon data PD3 with a player's number mapped thereon is read out. This polygon data PD3 corresponds to the above-mentioned hollowed part C21b and the portion other than the player's number is made transparent.

These polygon data PD1–PD3 so read out are mapped over the hollowed part 21b of player C21 in the order of PD1, PD2 and PD3 at step S505.

Moreover, face data FD of player C21 is mapped over the front face C21d of the head of player 21 in accordance with a player's number at step S506.

As a result, the entire body of the player is expressed with polygons and the player's number is indicated on the player's back by using texture mapping of polygons. As described above, polygons of the entire body, polygon of the player's number and face data are used to complete one character. Other players are composed in the same manner.

Since the second embodiment makes it possible to express a character including the player's number by using polygons and almost without using the texture mapping, many display objects (or characters) can be displayed with a small computation load.

Moreover, in order to reduce the processing of motion data computation, another approach may be taken to have only the part C21b, shown in FIG. 11, computed, to display the polygon as the player's number as in the second example and to synthesize the entire body with the player's number polygon. In this case, no computation is required for the head, both arms and legs. Poses of the entire body are predetermined and the head and both arms and legs are included in one pose. Accordingly, it is impossible to freely move only the arms or legs, but this approach can be used for poses of a high frequency such as a "ready pose."

According to the second embodiment, if only the player's number portion (PD1, PD2 and PD3) is prepared for twenty-two players, for example, the player's body parts (polygons) can be used in common. Although the players' physical build becomes all the same, the number of polygons can be considerably reduced. It is also possible to separately prepare polygons to express the player's entire body for characteristic players such as star players and to use the other players' polygons in common.

According to this embodiment, since the aforementioned three polygons (PD1, PD2 and PD3) are mapped over the hollowed part of a character's back, it is possible to simplify the polygon mapping processing.

[Third Embodiment]

A third embodiment is designed to realize a sense of far and near by executing a brightness changing processing, thereby showing players displayed in foreground in bright colors and players displayed at the back (or far from a viewpoint) in dark colors on the display screen of the CRT-type display 1a. Whether a player is close to or far away from the viewpoint is determined on the basis of the number of polygons.

This brightness changing processing is executed at step S6 of the main flowchart in FIG. 4. Details of step S6 are shown in the flowchart of FIG. 12.

Figure 12:
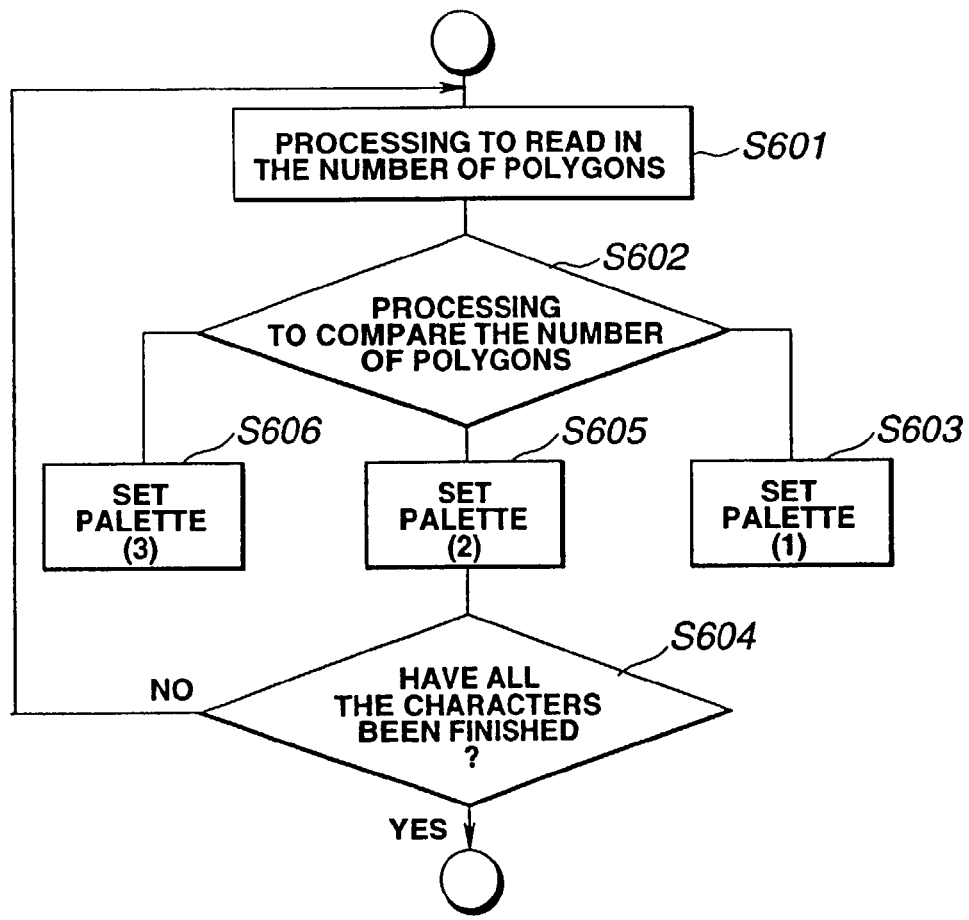
FIG. 12 is a flowchart which explains actions of a third embodiment of this invention.
Figure 13:
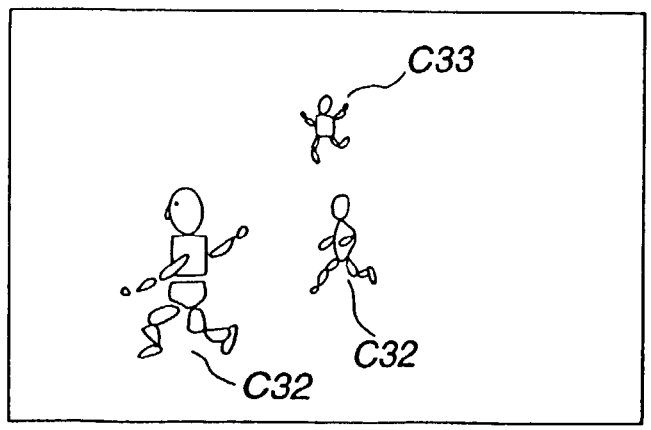
FIG. 13 describes an action of the third embodiment of this invention.

CPU 101 of the main game device 10 processes the flowchart of FIG. 12 and determines brightness of each player according to the number of its polygons.

At step S601, polygon data of a player (or character) to be displayed next are read out from the motion data ROM 111, etc.

Subsequently, at step S602, the read-out number of polygons composing the player is examined. Step S602 has the following three branches:

[First Branch]

When the player is composed of a large number of polygons, this means that the character is located close to the viewpoint (step S602: LARGE) as explained above. Therefore, a value of a bright color is set on a color bank type palette which determines brightness of the player (at step S603). At step S604, it is determined whether the brightness of all the players has been decided. If it has not been completed (step S604: NO), the device proceeds to the processing to read out polygon data at step S601 again.

[Second Branch]

When polygon data of the player are read out at step S601 and if there is an average number of polygons (step S602: AVERAGE), CPU 101 sets a value of moderate brightness on the color bank type palette (at step S605).

[Third Branch]

When polygon data of the player are read out at step S601 and if there is a small number of polygons (step S602: SMALL), CPU 101 sets a value of darkest colors on the color bank type palette (at step S605).

Details of the processing at step S602 to compare the number of polygons are as follows: Two threshold values th1 and th2 (th1<th2) are previously given. If the number of polygons is larger than the threshold value th2, the processing proceeds to step S603. If the number of polygons is smaller than the threshold value th1, the processing proceeds to step S606. If the number of polygons is between these threshold values, the processing proceeds to step S605. These threshold values may be constant values or may be changed according to the viewpoint position, color of the background or other factors.

The brightness so set on the color bank type palette at steps S603–606 is stored until it is displayed.

When the display timing of step S12 shown in FIG. 4 comes, player C31 closest to the viewpoint is displayed with brightest colors on the screen of the CRT-type display 1a. Player C32 at the middle position on the screen of the CRT-type display 1a is displayed with a little darker colors than those of player C31. Player C33 positioned farthest from the viewpoint is displayed with darker colors than the colors of player C32 at the middle position.

As described above, according to the third embodiment, the closer to the viewpoint the characters are located, the brighter the colors are used to display the characters, thereby improving a sense of near and far and enhancing the realistic excitement of a game.

Since the determination of near or far is conducted by the comparison of the number of polygons, the processing is simplified, thereby reducing a load on CPU.

As explained in the first embodiment, when the number of polygons composing a player, which attracts the game player's attention, is increased, it is sometimes determined that the number of polygons is large even though the player is located far away from the viewpoint. In this case, either (1) the higher brightness is set according to the number of polygons even if the player is located far from the viewpoint, or (2) the lower brightness is set according to the determination that the player is located far from the viewpoint on the basis of the original number of polygons. In the latter case (2), whether or not the original number of polygons should be referred to is determined on the basis of, for example, the existence of the attention mark m shown in FIG. 8.

Although in the above explanation whether a character is located close to or far from the viewpoint is determined on the basis of the number of polygons composing the character, such determination may be made on the basis of the distance between the viewpoint and the character. In this case, the threshold values th1 and th2 indicate the distance in a three-dimensional space, instead of the number of polygons.

Alternatively, the determination may be made on the basis of the size of a character on the screen. If all the characters are of almost the same size, it is possible to determine on the basis of the size of a character whether the character is located close to or far from the viewpoint.

Steps S603, S605 and S605 of the palette setting are not limited only to the setting of brightness. Either brightness, chroma or chromaticity, all of which are elements of colors, may be set at these steps. For example, a player close to the viewpoint may be set with a bright color tone and a player far from the viewpoint with a dark color tone.

Moreover, upon the setting of the palette, the setting may be changed as appropriate in accordance with colors of the background. For example, if the background is dark, low brightness may be set. If the background is bright, high brightness may be set.

In the above explanation, the players located close to the viewpoint are always composed of a large number of polygons. Without limitation to such a setting, however, the number of polygons composing a player located close to the viewpoint is sometimes reduced, for example, in the situation explained in the first embodiment, where there are three opponents A, B and C before the player (or character) operated by the game player and the player competes with these opponents in turn. In this case, as in the first embodiment, the number of polygons composing a beaten opponent is a little reduced and the brightness of the opponent is lowered even though the opponent is located close to the viewpoint.

As a general rule, color brightness of a player is determined on the basis of whether the player is close to or far from the viewpoint. At the same time, however, this general rule is modified as appropriate according to the circumstances (for example, actual situation of a play, relationship with players, relationship with a ball, and relationship with the background).

[Fourth Embodiment]

A fourth embodiment relates to a camerawork (or viewpoint position control) and provides a screen display by effectuating the viewpoint position changing means. The camerawork of the viewpoint position changing means makes it possible to display a full view of a soccer game and, for example, to display a part of the players in a close-up view on the screen of the CRT-type display 1a. The viewpoint in this fourth embodiment is provided in a virtual three-dimensional space and is a standard point, in other words, a camera position, for projecting polygons expressed in the virtual three-dimensional space onto a plane.

Figure 14:
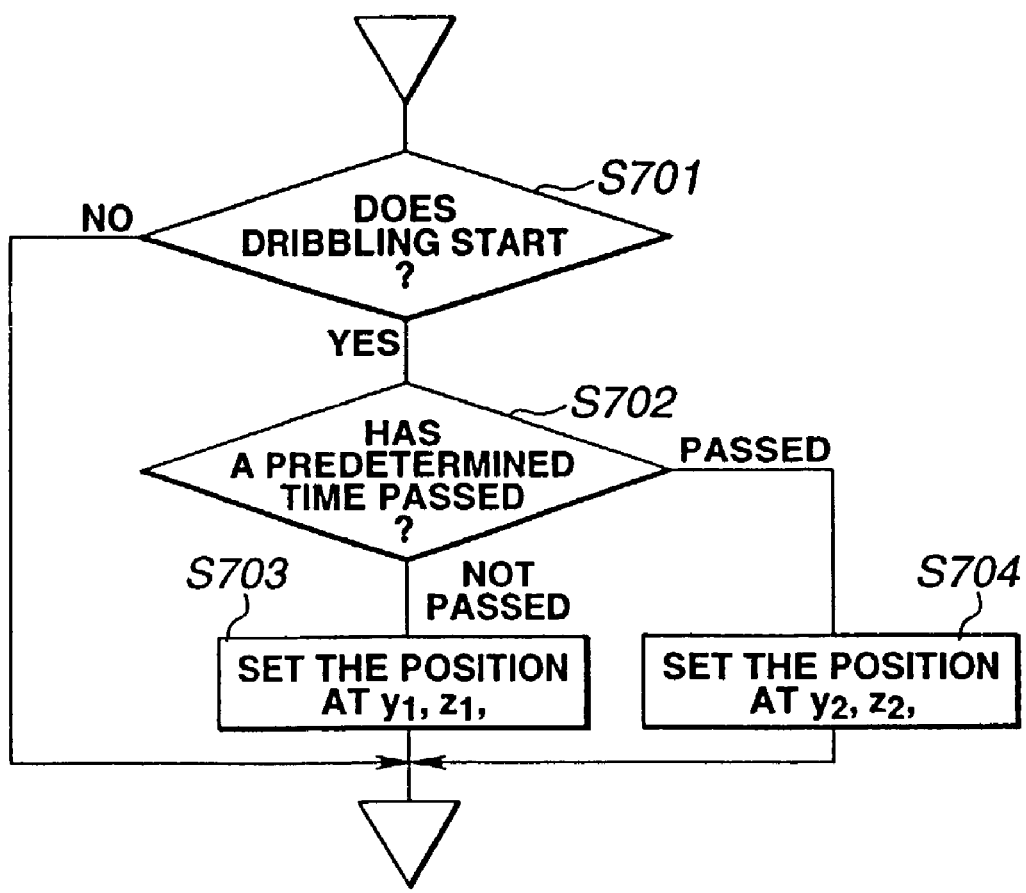
FIG. 14 is a flowchart which explains actions of a fourth embodiment of this invention.

The viewpoint position changing means of the fourth embodiment is effectuated when step S7 of the main flowchart shown in FIG. 4 is processed. Details of step S7 are shown in the flowchart of FIG. 14.

Figure 15:
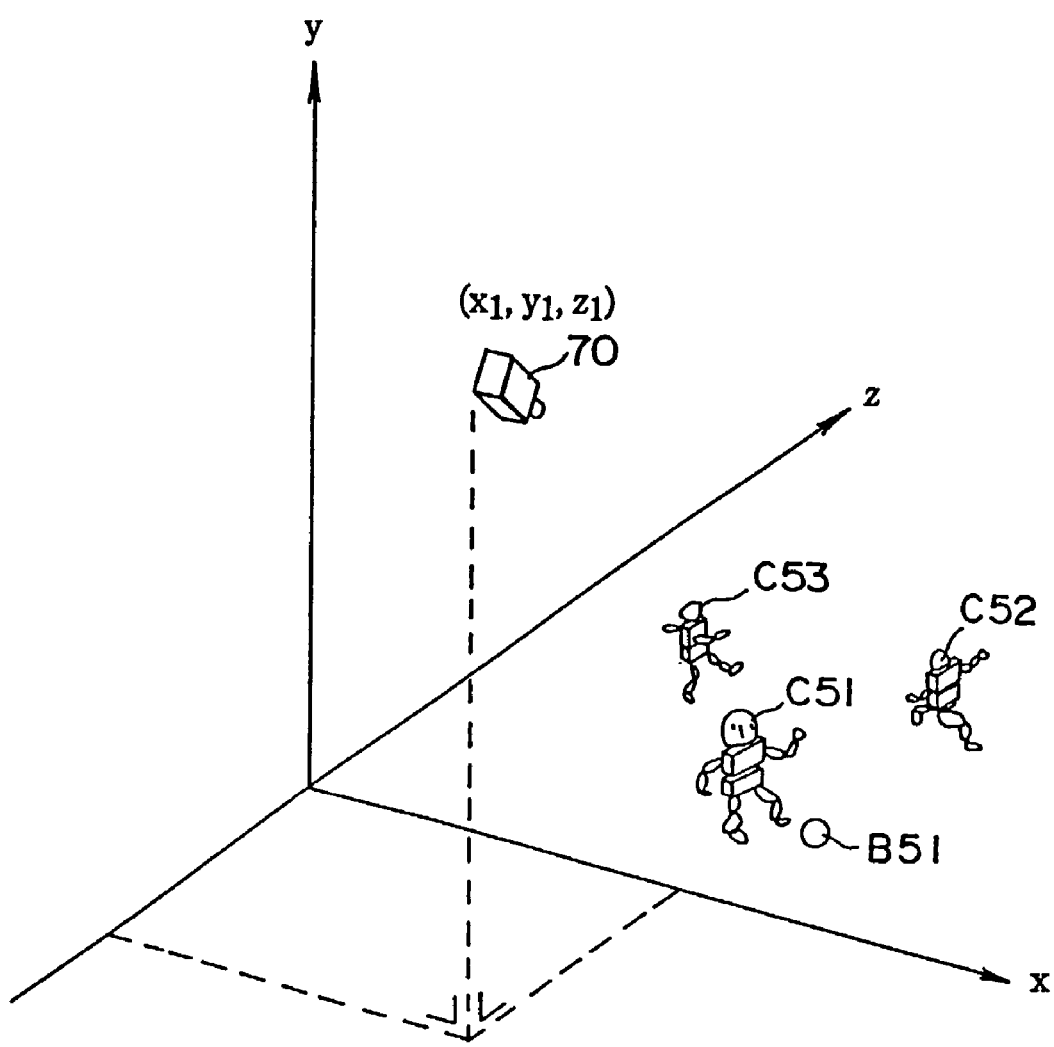
FIG. 15 describes the situation where a camera of the fourth embodiment of this invention is set at a high position for shooting.
Figure 16:
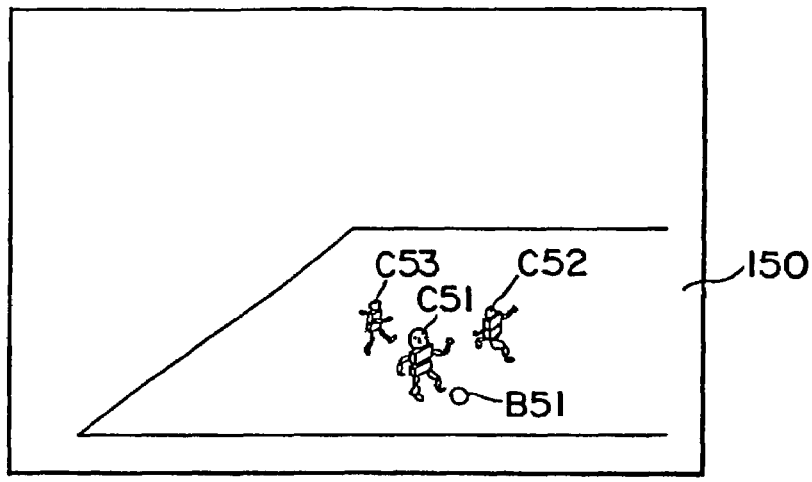
FIG. 16 shows a displayed picture shot at a high camera position according to the fourth embodiment of this invention.
Figure 17:
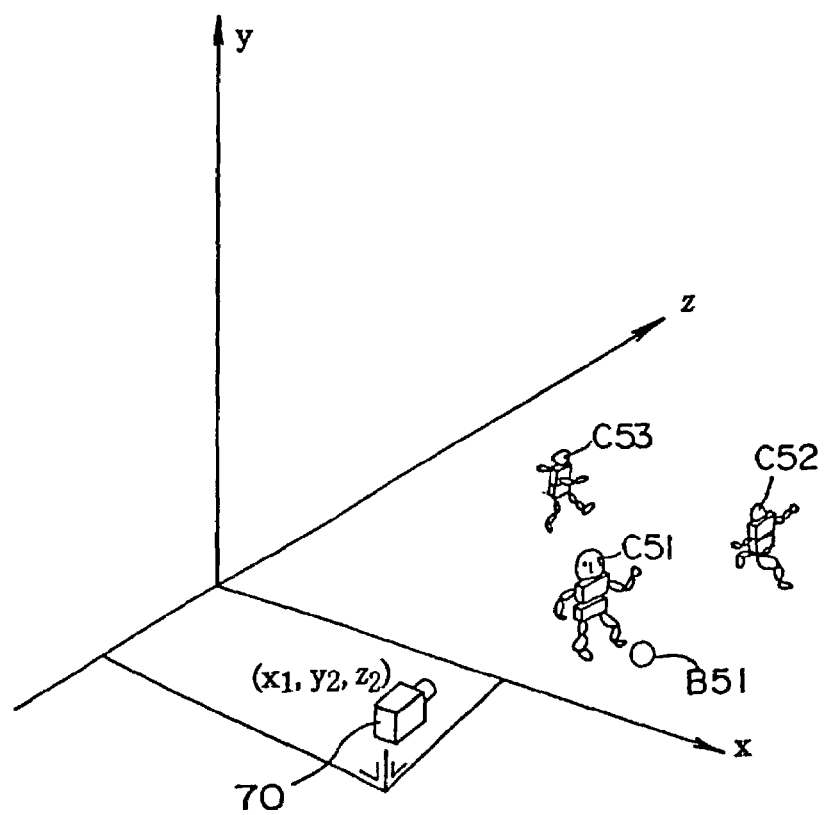
FIG. 17 describes the situation where a camera of the fourth embodiment of this invention is set at a low position for shooting.
Figure 18:
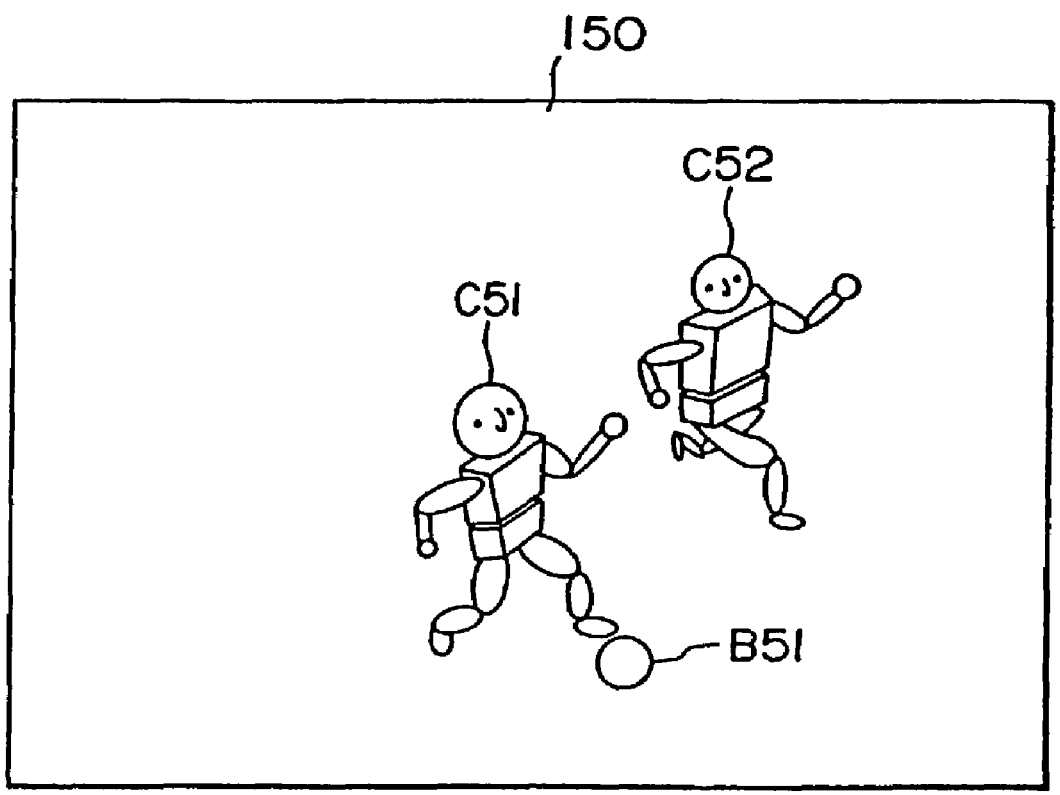
FIG. 18 shows a displayed picture shot at a low camera position according to the fourth embodiment of this invention.
Figure 19:
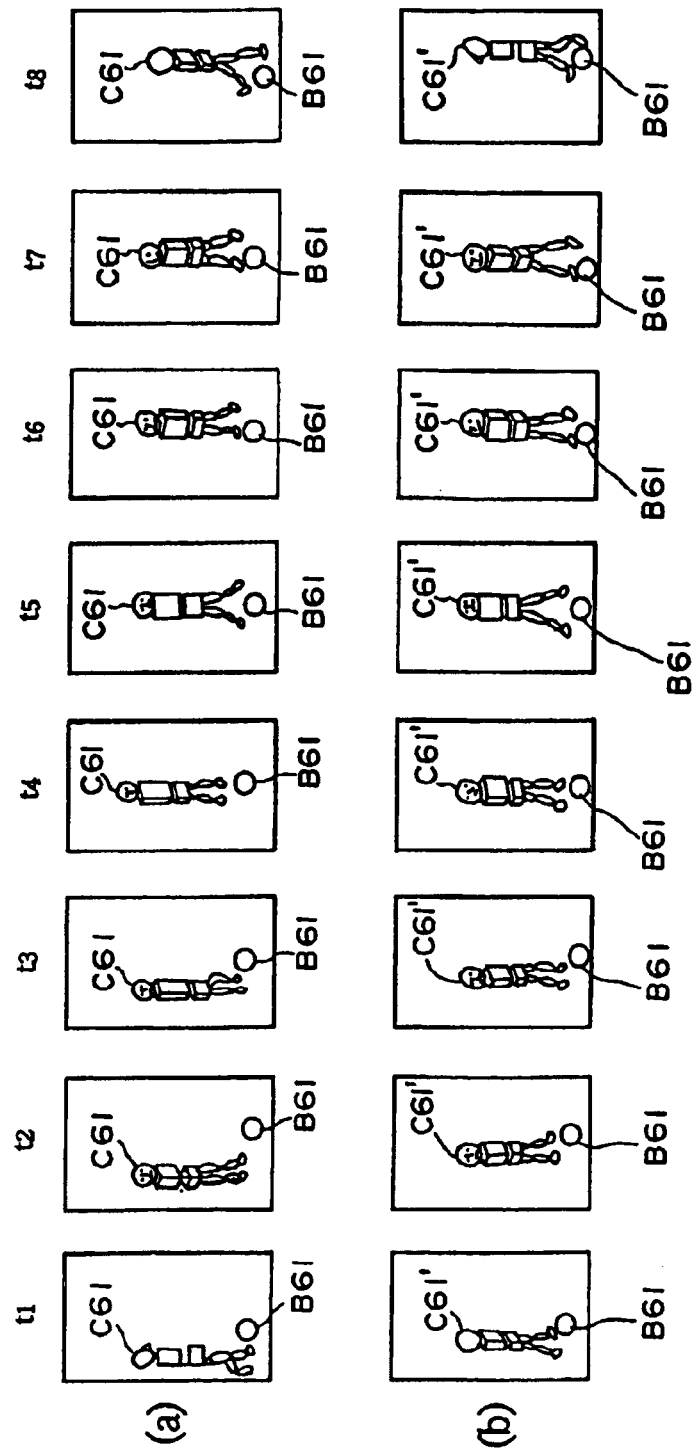
FIG. 19 describes motions of a fifth embodiment of this invention.

In the following explanation of the fourth embodiment, an example is used where the viewpoint position changing processing begins as dribbling starts in a soccer game. FIGS. 15 and 17 show examples of the position relationship between the camera position and players and FIGS. 16 and 18 show examples of pictures on the CRT-type display 1a as taken by such cameraworks.

In FIGS. 15 and 17, the x axis extends in a horizontal direction on the screen of the CRT-type display 1a, the y axis extends in a vertical direction and the z axis extends in a perpendicular direction. For example, let it be supposed that players C51, C52 and C53 are moving over the court in the three-dimensional space with the x, y and z axes, mainly in the x-axis direction in the position relationship shown in the figures and camera 70 is located at coordinates (x1, y1, z1) as shown in FIG. 15.

In this situation, CPU 101 determines at step S701 which player is dribbling. Whether or not dribbling is performed is determined on the basis of whether a player is holding ball B51 while moving, whether the player sometimes contacts with the ball, and whether the moving direction of the player corresponds with the moving direction of the ball. In FIG. 15, it is assumed that player C51 is dribbling ball B51.

The operation to be performed by the game player is hereinafter explained with reference to FIG. 2. The game player controls a related display object (or player C51) by using joystick 2a so that the movement of the related display object corresponds with the movement of a specific display object (or ball B51). In order to dribble the ball, the game player pushes down joystick 2a in a desirable direction. Since there are only eight moving directions 2c of joystick 2a, it is difficult to make player C51 reach the position of ball B51 correctly. Therefore, when player C51 reaches near a certain range, a processing is conducted as if the position of player C51 corresponds with the position of ball B51.

In the situation as shown in FIG. 15, whether a predetermined time has passed or not is determined at step S702. If a predetermined time has not passed (step S702: NOT PASSED), a picture of players C51–C53 is taken at the above-mentioned camera position (x1, y1, z1) (at step S703). Data taken at this camera position are stored until a predetermined display timing. Then, when step S12 in FIG. 4 is executed, screen 150 of a bird's-eye view is obtained as shown in FIG. 16. The entire court, including players C51–C53, is displayed on screen 150. After step S703 is processed, the program exits from this processing.

If dribbling is conducted (step S701: YES) and if a predetermined time has passed (step S702: PASSED), camera 70 is moved to coordinates (x1, y2, z2) as shown in FIG. 17 (at step S704). Assuming that the game player's viewpoint is the origin of the coordinate system for convenience, a direction toward the back of the screen is (+) of the z axis and an upward direction in the screen is (+) of the y axis. Therefore, the position relationship can be expressed as y2<y1 and z2>z1.

Data for displaying player C51 and other characters at this camera position are stored until a predetermined display timing. When step S12 in FIG. 4 is executed, player C51 is particularly displayed in a close-up view and the picture taken at a lower camera position is displayed on screen 150 as shown in FIG. 18. After step S704 is processed, the program exits from this processing.

According to the fourth embodiment, a picture of the entire court is displayed on the screen of the CRT-type display 1a on the basis of a comparatively remote and high camera position. For a certain attention picture, it is possible to, for example, close up the character by changing the angle of the viewpoint against the character, thereby enhancing the realistic excitement of a game.

In this embodiment, dribbling is assumed to be a specific attention picture. However, without limitation to such assumption, the specific attention picture may be set when a player far from the viewpoint takes control of a ball.

Moreover, a corner kick, goal kick, free kick, PK, throw-in, or other action may be set as the attention picture. For example, a player which moves toward a ball in order to kick it may be taken with a gradual close-up.

In conclusion, the attention picture means a picture of a scene where the realistic excitement of a game heightens. The viewpoint position changing means of this embodiment is capable of displaying an optional attention picture on display 1a effectively by properly changing the camera position as the excitement of a game heightens.

Moreover, in the above-described embodiment, the camera position is fixed along the x-axis direction and is made changeable along the y-axis and z-axis directions. However, the camera position may be changed also along the x-axis direction as well as the y-axis and z-axis directions. Also, the camera position may be moved by changing either the y axis or the z axis.

[Fifth Embodiment]

A fifth embodiment relates to a motion correcting processing. The motion correcting processing intends to make a ball and a player's foot contact with each other as in an actual soccer game and to avoid unnatural movements of the ball and player, particularly the ball and the player's foot.

This processing intends to prevent unnatural movements caused by the reason that motions of a player's foot are previously determined and, therefore, the movement of a ball does not interlock with the movement of a player's foot. For this purpose, the ball position is changed to correspond with the motions of the player's foot or the ball direction is adjusted. For example, when the player turns around, the ball position is adjusted. When the player dribbles the ball, the ball direction is adjusted.

An example is hereinafter explained where player C61 turns around ball B61.

FIG. 19(a) shows turning motions when the motion correcting processing of the fifth embodiment is not conducted. These figures shows the relationship between player C61 and ball B61 at time t1 through t8 in the order from left to right.

Let it be supposed that ball B61 is moved to a target point, and that player C61 is estimated by contact determination to contact with the ball in the eighth scene (at time t8). CPU 101 performs the processing to assign the motions of player C61 necessary for turning respectively to each scene, that is, to the first scene (time t1), second scene (time t2), third scene (time t3), fourth scene (time t4) through eighth scene (time t8), and to make the ball and the foot of player C61 contact with each other in the eighth scene (time t8). For example, player C61 faces toward the right side at time t1, and jumps and faces slightly half front at time t2. Player C61 faces gradually obliquely at time t3 and thereafter, and finally faces front at time t5. Player C61 faces toward substantially the left side at time t7.

However, the motion of player C61 in each scene is determined, resulting in situations, for example, where ball B61 and the foot of player C61 do not contact with each other even in the eighth scene, or motions change greatly when the motion of player C61 in one scene proceeds to the next scene. If the player moves in this way, the movements of the ball and player seem to be unnatural.

If the motion correcting processing of the fifth embodiment is executed, the motions of player C61 assigned to each scene will be assigned equally to the eight respective scenes, thereby making it possible to display ball B61 and the foot of player C61 in a manner such that they naturally contact with each other.

The motion correcting processing of the fifth embodiment is hereinafter explained with reference to the flowchart of FIG. 20. Player C61 is assumed to have control over ball B61.

At step S801, it is determined whether or not joystick 2a is pushed down. If joystick 2a is not pushed down (step S801: NO), the program exits from this processing.

On the other hand, if joystick 2a is pushed down in a certain direction (step S801: YES), CPU 101 detects this direction data. CPU 101 receives the direction data (at step S802) and makes player C61 and ball B61 move in that direction (at step S803). This state is stored as data.

At step S804, it is determined whether or not joystick 2a is moved in a reversed direction. If there is no reverse operation (step S804: NO), the program exits from this processing. When the display timing of step 13 shown in FIG. 4 comes, a picture of a player moving and dribbling in a specified direction is displayed on the CRT-type display 1a.

Next, let it be supposed that the game player pushes joystick 2a in a direction opposite to the above-mentioned direction (step S804: YES). This command is detected by CPU 101 at step S804. CPU 101 then performs forecasting computation for contact determination at step S805. As a result, for example, it is determined that ball B61 and player C61 contact with each other in the eighth scene at time t8 as shown in FIG. 19(b). CPU 101 performs the forecasting computation on the basis of the speed of ball B61 and the jumping direction, height and speed of player C61.

Accordingly, CPU 101 reads out basic motions of player C61, which correspond to the respective scenes at time t1 through t8, from stored data at step S806. These basic motions are shown in FIG. 19(a).

As CPU 101 forecasts that player C61 contacts with ball B61 in the eighth scene at time t8, it performs a correcting computation in order to change the basic motion of player C61 corresponding to the eighth scene to a more appropriate motion for that scene (at step S807). Data of player C61' after this correcting computation are stored and then the program exits from this processing.

The positions of player C61' in the respective scenes at time t1 through t8 as shown in FIG. 19(b) are shifted from the positions of player C61 in the respective scenes at time t1 through t8 as shown in FIG. 19(a) in order to realize more proper positions. At the end, ball B61 and the foot of player C61 contact with each other as player C61 completes turning around.

Every time steps S1 through S12 of FIG. 4 are executed, the scene changes to the scenes at time t1 through time t8 and is displayed on the CRT-type display 1a at the display timing at step S12 of FIG. 4.

According to the fifth embodiment, ball B61 and the legs of player C61 move quite naturally and, therefore, the movements similar to those in an actual soccer game are realized. The displayed picture including display objects (or characters) are expressed richly and the display objects (or characters) can be controlled in various manners in relation to the operation.

Figure 20:
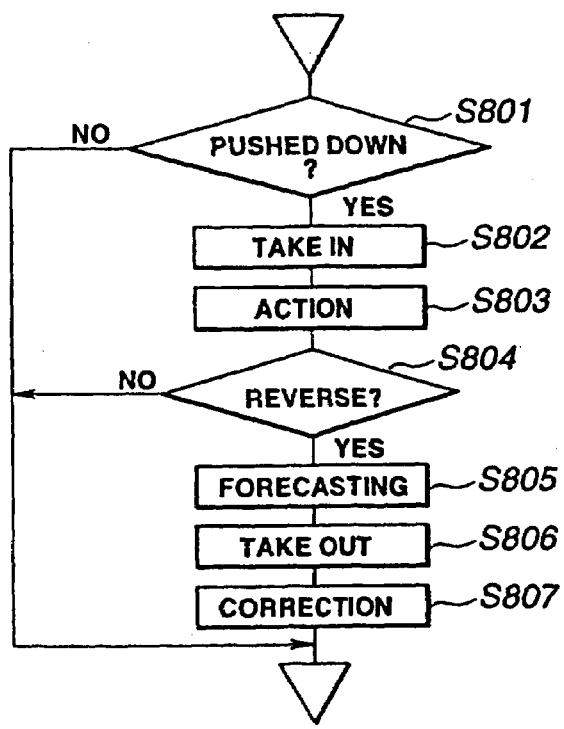
FIG. 20 is a flowchart which explains actions of the fifth embodiment of this invention.

When one motion, such as dribbling, proceeds to another motion, such as turning, according to the fifth embodiment and if the object player has control over the ball according to the fourth embodiment, even if the joystick (or operation stick) is pushed down in a direction opposite to the running direction while the player moves toward the ball, the mode does not immediately change to the turning mode at this point, but the correcting processing for turning is executed according to the flowchart shown in FIG. 20. It is also possible to make the player properly control the ball by means of correction processing without controlling the related display object (or player C61) so that movement of the related display object corresponds with the movement of the specific display object (or ball B61). Accordingly, even if the joystick is not operated accurately, it is possible to follow the game player's intention to make the player take control over the ball and turn around.

For example, when joystick 2a is pushed down in order to move the ball toward the player, even if the pushing direction does not accurately correspond with the moving direction of ball B61, it is possible to move ball B61 toward player C61 if the pushing direction is within a predetermined range. As can be seen in FIG. 2, the moving directions of joystick 2a are limited to eight directions and the designation of movement is only possible for every 45 degrees. If two pushing directions close to ball B61 are selected, the picture processing is conducted so that player C61 accurately corresponds with ball B61 by means of the correction processing.

On the other hand, if the control over the ball is not transferred to the player subject to the operation, the mode proceeds to the turning mode when the joystick is pushed down in a direction opposite to the running direction.

Accordingly, it is possible to realize the developments of the game in accordance with the game player's intention to cancel the movement to go and get the ball.

[Sixth Embodiment]

According to a sixth embodiment, when the game player executes an operation other than the operation concerning which a description of normal operation 2d of the operation buttons 2b is indicated on the operation panel 2 of housing 1 as shown in FIG. 2, a description of such operation can be displayed on the CRT-type display 1a.

Figure 21:
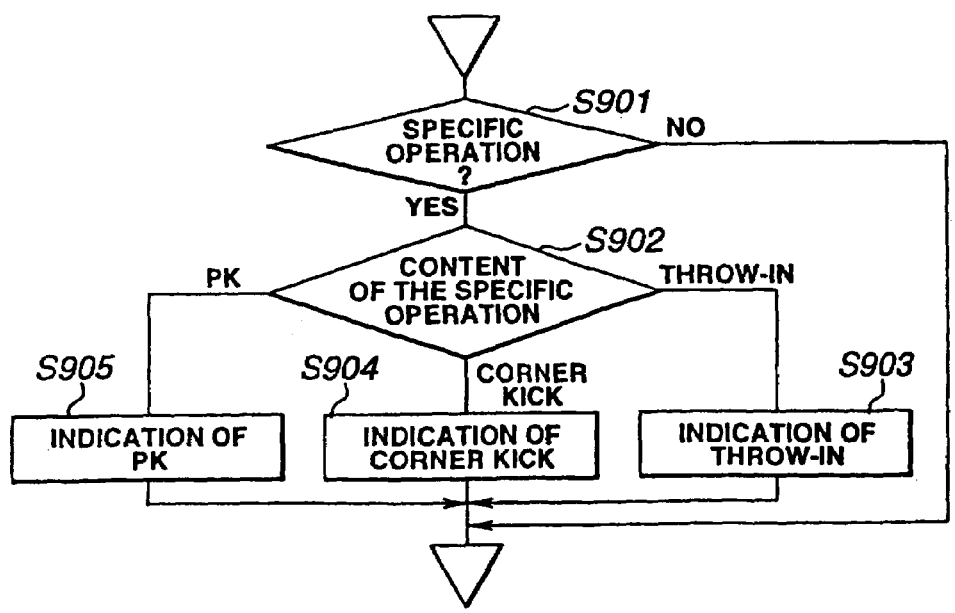
FIG. 21 is a flowchart which explains actions of a sixth embodiment of this invention.

Operation content outputting means of this embodiment is effectuated by executing step S9 of FIG. 4. Details of this processing is shown in FIG. 21.

Generally, the operating directions 2c of joystick 2a and the description 2d of normal usage of the operation buttons 2b are provided on the operation panel 2. Let it be supposed that as a soccer game proceeds, it is decided to change the mode to a throw-in mode. In other words, assuming that it becomes necessary to display the content of operation concerning which no description is originally given to the housing (step S901: YES), CPU 101 determines at step S902 in which mode the content of the specific operation is.

For example, if the mode of the specific operation is a throw-in (step S901: THROW-IN), CPU 101 gives directions to a scroll data computing device 107, etc. and forms data capable of displaying necessary button indications 20a, 20b and 20c at the lower left of the screen. Similarly, CPU 101 forms data capable of displaying description indications 21a, 21b and 21c respectively assigned to the respective button indications 20a, 20b and 20c. In this case, the description indication 22a indicates a short throwing, the description indication 22b indicates a long throwing, and the description indication 22c indicates prohibition of use. They are stored until a predetermined timing.

Figure 22:
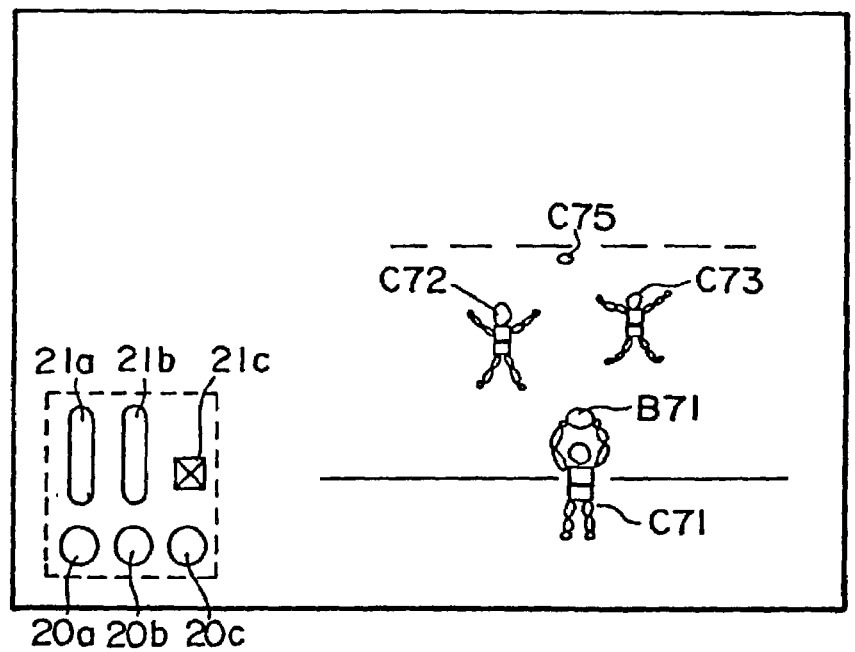
FIG. 22 describes an action example of the sixth embodiment of this invention.

If the stored data are displayed at a predetermined display timing (at step S12 of FIG. 4), as shown in FIG. 22, player C71 which has ball B71 and is going to throw it, and players C72 and C73 within court C75 are displayed and the respective button indications 20a, 20b and 20c and the description indications 21a, 21b and 21c showing the content of operations of these button indications are also displayed at the lower left of the screen.

If the mode is a goal kick (or PK) (at step S901: PK), CPU 101 gives directions to the scroll data computing device 107, etc. and forms data capable of displaying the necessary button indications 20a, 20b and 20c at the lower right of the screen. Similarly, CPU 101 forms data capable of displaying description indications 22a, 22b and 22c respectively assigned to the respective button indications 20a, 20b and 20c. In this case, the description indication 22a indicates prohibition of use, the description indication 22b indicates prohibition of use, and the description indication 22c indicates short. They are stored until a predetermined timing.

Figure 23:
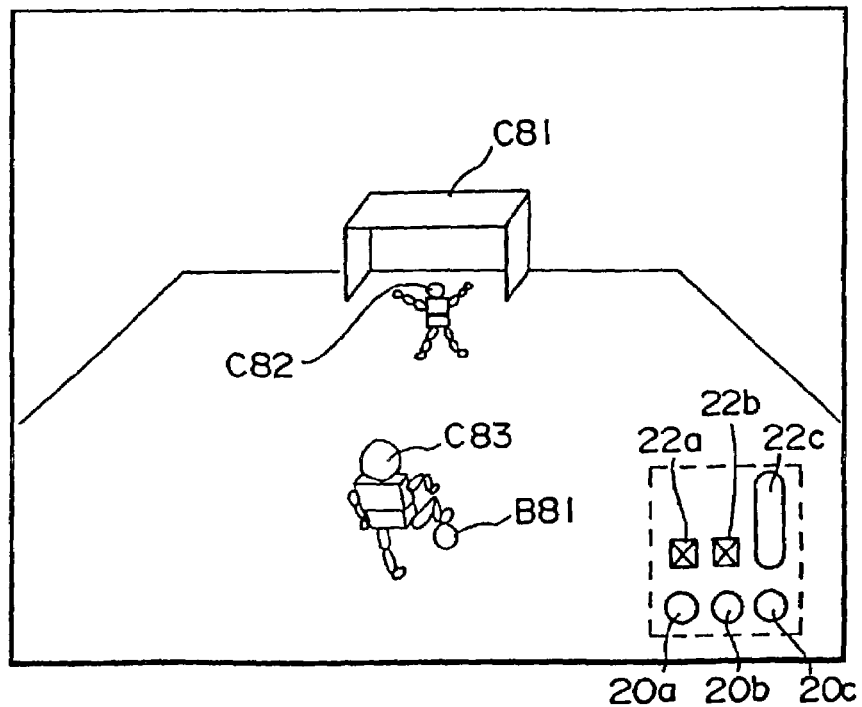
FIG. 23 describes another action example of the sixth embodiment of this invention.

If the stored data are displayed at a predetermined display timing (at step S12 of FIG. 4), as shown in FIG. 23, a goal keeper C82 standing in front of goal C81 and player C83 which is closer to the viewpoint and is going to make a goal kick with ball B81 placed under its foot are displayed, and the respective button indications 20a, 20b and 20c and the content of operation thereof (description indications 22a, 22b and 22c) are also displayed at the lower right of the screen.

In the case of a corner kick as well (step S902: CORNER KICK), data is formed which is capable of displaying the respective button indications 20a, 20b and 20c as well as the description indications 22a, 22b and 22c assigned to the buttons (at step S904).

Since the sixth embodiment is designed to indicate only the minimum necessary descriptions on the operation panel 2 of housing 1 and to indicate the content of other operations on the screen as necessary, the game player does not have to read all the descriptions before starting a game and the necessary descriptions are displayed every time when the corresponding operation is required. Therefore, it is possible to provide a game device, the operating method of which is easily understandable for a game player.

According to the sixth embodiment, since the game player can operate players and other characters after reading the content of operations, the operation to express characters becomes easier in relation to the operation performance.

In order to indicate necessary descriptions on the screen, a flag may be provided for each mode (throwing, PK, kick, dribbling, etc.) so that "1" be set at the flag of the mode which requires a description.

The sixth embodiment is designed to display the operation button indications 20a, 20b and 20c, the description indications 21a, 21b and 21c and the description indications 22a, 22b and 22c assigned to the button indications at the position on the screen, which is not disturbing for a game. The position on the screen, which is not disturbing for a game, means the position which does not overlap with the players, ball and goal. It also means the position which does not overlap with a passage of the ball, for example, the background portion where sky or spectators' sheets are displayed, or a portion of the court having no direct relationship with the play.

A soccer game is referred to as an example of the above embodiments for explanation. However, the present invention can be applied to other ball games, such as rugby, American football, volleyball or basket ball, or ice hockey or other games.

What is claimed is:

1. A method for expressing a display object in a game by composing the display object with a plurality of elements, comprising:
   changing an amount of said elements according to a distance between a viewpoint and said display object;
   projecting the display object in a three-dimensional space onto a plane based on said viewpoint;
   determining whether the display object is a focus of attention of a game player operating the game; and
   changing the amount of said elements which compose said display object at a distance far from said viewpoint when attributes of the display object change, wherein when the display object is the focus of attention, the amount of the elements of the display object is increased.

2. The method of claim 1, wherein changing the amount of said elements and projecting the display object decreases the amount of said elements as said display object moves farther away from said viewpoint.

3. The method of claim 2, wherein changing the amount of said elements which compose said display object at a distance far from said viewpoint when said display object becomes an object of operation and, therefore, the attributes of said display object change.

4. The method of claim 3, wherein changing the amount of said elements which compose said display object at a distance far from said viewpoint further comprises:
   determining a necessity of increase in the amount of elements, which establishes whether the amount of elements of said display object should be increased;
   determining whether said display object has become the object of operation; and
   calculating an increase in the amount of elements based on whether said display object has become the object of operation.

5. The method of claim 4, wherein said display object includes a plurality of first display objects and a second display object having some relationship with said plurality of first display objects in a three-dimensional space, the method further comprising:
determining that one of said plurality of first display objects which has gained control over said second display object is the object of operation, when said plurality of first display objects compete with each other for control over said second display object.

6. The method of claim 5, wherein determining whether said display object has become the object of operation comprises:
establishing an order of said first display objects based on a distance between said plurality of first display objects and said second display object;
finding a moving direction of a first display object having a highest order among said plurality of first display objects;
granting control over the second display object to said first display object having the highest order when said first display object moves toward said second display object; and
granting control over the second display object to a first display object having a second highest order among said plurality of first display objects when said first display object having the highest order is not moving toward said second display object.

7. The method of claim 6, further comprising giving a mark to the display object having control.

8. The method of any one of claims 1 through 7, comprising:
outputting operation signals to said display object; and
displaying said display object.

9. The method of claim 1, further comprising, storing procedures associated with the method in a storage medium for execution by a processing device.

10. The method of claim 1, wherein changing the amount of said elements according to a distance between a viewpoint and said display object, and projecting the display object in a three dimensional space onto a plane based on said viewpoint are performed by a picture processing means.

11. The method of claim 1, wherein changing the number of said elements which compose said display object at a distance far from said viewpoint is executed by an element number changing means.

12. The method of claim 5, wherein determining that one of said plurality of first display objects which has gained control over said second display object is the object of operation is performed by an attribute determining means.

13. A method for expressing a display object in a game by composing the display object with a plurality of elements, comprising:
changing an amount of said elements according to a distance between a viewpoint and said display object and for projecting the display object in a three-dimensional space onto a plane based on said viewpoint;
determining whether the display object is a focus of attention of a game player operating the game; and
changing the amount of said elements when attributes of the display object change, wherein at least one of the attributes indicates whether the display object is the focus of attention of the game player operating the game, wherein when the display object is the focus of the game player's attention, the amount of the elements of the display object is increased.

14. The method of claim 13, wherein changing the amount of elements according to the distance between a viewpoint and said object for projecting the display object is performed by a picture processing means.

15. The method of claim 13, wherein changing the amount of elements when attributes of the display object change is performed by an element number changing means.

16. A method for processing a picture in a game device having a display and a processor, the method comprising:
expressing a display object as a plurality of elements;
processing pictures by varying the amount of elements based on the viewpoint between a game player operating a game and the display object and for projecting the display object in a three-dimensional space onto a plane based on said viewpoint; and
determining whether the display object is a focus of attention of the game player operating the game,
wherein said processor varies the amount of elements when attributes of the display object change, and wherein at least one of the attributes indicates whether the display object is the focus of the game player's attention, wherein when the display object is the focus of the game player's attention, the amount of the elements of the display object is increased.

17. The method of claim 16, further comprising decreasing the amount of elements as the display object moves farther away from the viewpoint.

18. The method of claim 17, further comprising varying the amount of elements when said processor determines that the display object has become an object of operation and the attributes of the display object have changed.

19. The method of claim 16, wherein expressing a display object as a plurality of elements is performed by a display.

20. The method of claim 16, wherein varying the number of elements is performed by a processor.

21. A method for expressing a display object by composing the display object with a plurality of elements, said method comprising:
setting an amount of said elements according to a distance between a viewpoint and said display object and for projecting the display object in a three-dimensional space based on said viewpoint;
establishing said display object as a particular object which will attract a game player's attention;
determining whether the particular object is a focus of attention of the game player operating the game; and
changing the amount of elements that compose said particular object, by increasing the amount of elements before the particular object becomes the focus of attention of the game player operating the game, wherein the amount of elements is increased when the particular object is the focus of attention of the game player.

22. The method of claim 21, wherein setting the amount of said elements according to the distance between a viewpoint and said display object, and projecting the display object in a three-dimensional space are performed by a picture processing device.

23. The method of claim 21, wherein determining said display object as a particular object is performed by a determination device.

24. The method of claim 21, wherein changing the amount of elements which composes said particular object is performed by an element number changing device.

* * * * *